US012654863B2

(12) United States Patent (10) Patent No.: US 12,654,863 B2
Froebel et al. (45) Date of Patent: Jun. 16, 2026

(54) AIRCRAFT-SEAT ARRANGEMENT

(71) Applicant: RECARO Aircraft Seating GmbH & Co. KG, Schwaebisch Hall (DE)

(72) Inventors: Marcel Froebel, Schwaebisch Hall (DE); Pawel Pronobis, Michelbach an der Bilz (DE); Christoph Lahmeyer, Ulm (DE); Jürgen Dukin, Gaildorf (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 210 days.

(21) Appl. No.: 18/292,213

(22) PCT Filed: Jul. 26, 2022

(86) PCT No.: PCT/EP2022/070969
§ 371 (c)(1),
(2) Date: Jan. 25, 2024

(87) PCT Pub. No.: WO2023/006762
PCT Pub. Date: Feb. 2, 2023

(65) Prior Publication Data
US 2024/0359797 A1 Oct. 31, 2024

(30) Foreign Application Priority Data

Jul. 26, 2021 (DE) ..................... 10 2021 119 323.0

(51) Int. Cl.
*B64D 11/06* (2006.01)
(52) U.S. Cl.
CPC ................................. *B64D 11/0644* (2014.12)
(58) Field of Classification Search
CPC .... B64D 11/0644; B60N 2/763; B60N 2/753; B60N 2/767; A47C 7/541; A47C 7/543
See application file for complete search history.

(56) References Cited

U.S. PATENT DOCUMENTS

2007/0200414 A1* 8/2007 Pozzi ..................... B60N 3/102
297/217.3
2011/0272991 A1* 11/2011 Saxton ............... B64D 11/0646
297/411.46
(Continued)

FOREIGN PATENT DOCUMENTS

DE 202018102277 U1 5/2018
DE 102017003121 A1 10/2018
WO 2013/163260 A1 10/2013

OTHER PUBLICATIONS

German Search Report dated Jul. 14, 2022 issued for corresponding German Patent Application No. 102021119323.0 (and English translation).
(Continued)

*Primary Examiner* — Tye William Abell
(74) *Attorney, Agent, or Firm* — Posz Law Group, PLC

(57) ABSTRACT

The invention is based on an aircraft seat device having a seat divider, having an armrest, which is pivotable, with respect to the seat divider, between a position of use and a position of non-use and which has an armrest base body, and having an attachment module, which is configured to support the armrest in a pivotable manner with respect to the seat divider, wherein the armrest base body, in a fully installed state, is coupled with the seat divider via the attachment module.

Figure 1:
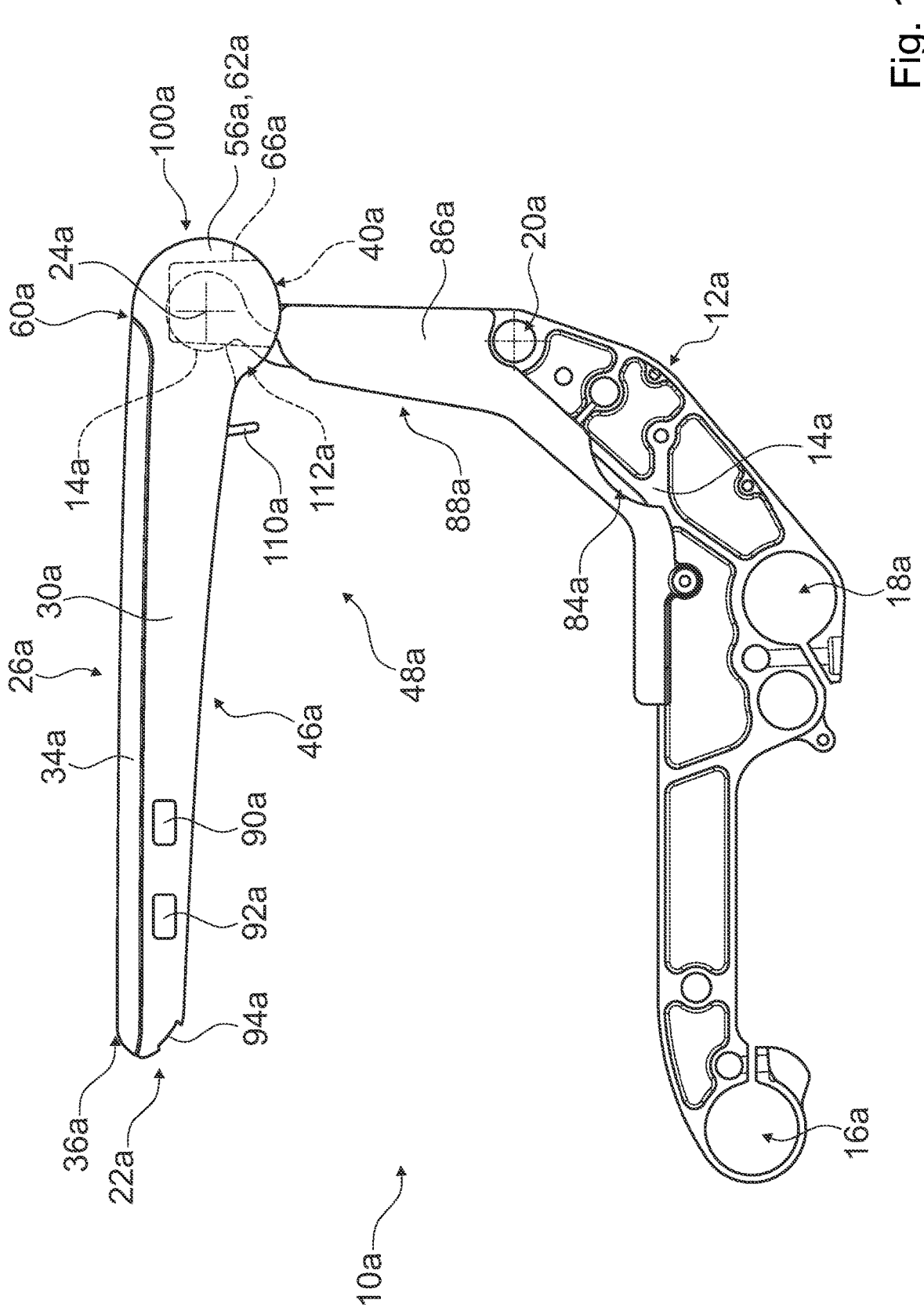

It is proposed that the attachment module is pivotably connected to the seat divider and is configured, in an installation state in which the attachment module is connected to the seat divider, for coupling with the armrest base body, wherein the attachment module, in the fully installed state, is received at least substantially in an attachment space of the armrest.

23 Claims, 8 Drawing Sheets

(56) References Cited

U.S. PATENT DOCUMENTS

| | | | |
|---|---|---|---|
| 2015/0091337 A1* | 4/2015 | Cailleteau | B64D 11/064 |
| | | | 297/354.1 |
| 2019/0283883 A1* | 9/2019 | Murnan | B60N 2/767 |
| 2020/0317349 A1* | 10/2020 | Achilles | B64D 11/0649 |

OTHER PUBLICATIONS

International Search Report of the International Searching Authority mailed Oct. 20, 2022 for corresponding International Application No. PCT/EP2022/070969 (and English translation).
International Preliminary Report on Patentability mailed Jan. 18, 2024 and Written Opinion of the International Searching Authority mailed Oct. 20, 2022 in the corresponding International Application No. PCT/EP2022/070969.
Office Action mailed Feb. 12, 2025 in corresponding European Patent Application No. 22750723.3.

* cited by examiner

AIRCRAFT-SEAT ARRANGEMENT

CROSS-REFERENCE TO RELATED APPLICATIONS

This patent application is based on and incorporates herein by reference the German patent application DE 10 2021 119 323.0, filed on Jul. 26, 2021, and the international patent application PCT/EP2022/070969, filed on Jul. 26, 2022.

PRIOR ART

The invention relates to an aircraft seat device.

There has already been proposed an aircraft seat device having a seat divider, having an armrest, which is pivotable, with respect to the seat divider, between a position of use and a position of non-use and which has an armrest base body, and having an attachment module, which is configured to support the armrest in a pivotable manner with respect to the seat divider, wherein the armrest base body, in a fully installed state, is coupled to the seat divider via the attachment module.

The object of the invention is, in particular, to provide an arrangement of the generic type that has improved properties in respect of fabrication and/or comfort. The object is achieved, according to the invention.

Advantages of the Invention

The invention is based on an aircraft seat device having a seat divider, having an armrest which is pivotable, with respect to the seat divider, between a position of use and a position of non-use and which has an armrest base body, and having an attachment module, which is configured to support the armrest in a pivotable manner with respect to the seat divider, wherein the armrest base body, in a fully installed state, is coupled to the seat divider via the attachment module.

It is proposed that the attachment module be pivotably connected to the seat divider and be configured, in an installation state in which the attachment module is connected to the seat divider, for coupling to the armrest base body, wherein the attachment module, in the fully installed state, is received at least substantially in an attachment space of the armrest. The design according to the invention allows the aircraft seat device to be fabricated in an advantageously efficient manner. The design according to the invention allows the armrest to be installed on and removed from the seat divider in an advantageously simple manner. Furthermore, the design according to the invention makes it possible to provide an attachment module that is advantageously easily installed. The design according to the invention also allows advantageously quick and easy replacement of the armrest.

Preferably, the aircraft seat device is part of an aircraft seat and/or of an, in particular, interconnected row of aircraft seats comprising at least two aircraft seats. Preferably, the aircraft seat device comprises a stand unit, via which the aircraft seat device, in particular the at least one aircraft seat, can be erected on a stand plane. Preferably, the seat divider is connected to the stand unit.

Preferably, the armrest, in the fully installed state, is fully installed on the seat divider and, in particular, can be used by a passenger. Preferably, the armrest base body, in the fully installed state, is connected to the seat divider via the attachment module. Preferably, the armrest base body is configured to divert support forces acting upon the armrest, in particular resulting from bearing contact of a passenger's arm, into the seat divider. A "position of use" is preferably to be understood as a position of the armrest in which an axis of main extent of the armrest is aligned at least substantially parallel to a plane of main extent of a seat base of the aircraft seat. Preferably, a passenger, in particular when in an upright sitting position on the aircraft seat, can place their arm on the armrest when it is in the position of use. A "position of non-use" is preferably to be understood as a position of the armrest in which the axis of main extent of the armrest is aligned at least substantially parallel to a plane of main extent of a backrest of the aircraft seat. Preferably, the passenger, in particular when in an upright sitting position on the aircraft seat, cannot place their arm on the armrest when it is in the position of non-use. Preferably, the armrest, when in the position of non-use, is pivoted, in particular to a maximum, with respect to the position of use.

Preferably, the attachment module is realized as an installation interface for the armrest. Preferably, the attachment module is of a modular design. Preferably, the attachment module is configured so that armrests of differing designs can be coupled to the attachment module. The term "configured" is preferably be understood to mean specially designed and/or equipped. That an object is configured for a particular function, is to be understood to mean, in particular, that the object fulfils and/or performs this particular function in at least one application state and/or operating state. Preferably, the attachment space is configured to receive the attachment module in the armrest. Preferably, the attachment space is formed by the armrest base body. Preferably, the attachment space is delimited by an outer contour of the armrest base body, in particular in a side view of the aircraft seat device. An "outer contour" is preferably be understood to mean an outermost contour of the armrest base body, in particular irrespective of a direction of view with respect to the armrest base body. A "side view of the aircraft seat device" is preferably be understood to mean a view in a direction orthogonal to a longitudinal axis of the armrest and parallel to the stand plane. Preferably, the side view corresponds to a direction of view along the pivot axis of the armrest. "Received at least substantially in an attachment space of the armrest" is preferably to be understood to mean that the attachment module, in particular in a side view of the aircraft seat device, is arranged by at least 75%, preferably by at least 90% and particularly preferably by at least 95% in the attachment space. Preferably, the attachment module, in the fully installed state, does not protrude beyond the outer contour of the armrest base body. Preferably, the attachment module, in the fully installed state, is arranged entirely in the attachment space of the armrest. In principle, "at least substantially" is be understood to mean that a deviation from a predefined value is in particular less than 25%, preferably less than 10% and particularly preferably less than 5% of the predefined value.

It is furthermore proposed that, in an installation state in which the attachment module is connected to the seat divider, the armrest base body can be installed on the attachment module. This design allows the armrest to be coupled to the attachment module in an advantageously simple and rapid manner. Thus, advantageously, the armrest can be easily installed on the seat divider. The term "can be installed" is preferably to mean both that the armrest can be coupled to the attachment module and that the armrest can be decoupled from the attachment module, in particular in a non-destructive manner. Preferably, the armrest base body is configured to be removable from the attachment module in the installation state in which the attachment module is connected to the seat divider. Preferably, the armrest, in particular the armrest base body, is configured to be pushed onto the attachment module, in particular in the installation state in which the attachment module is connected to the seat divider.

It is also proposed that the armrest base body be connected to the attachment module by at least one fastening element, wherein the at least one fastening element, in a fully installed state, is concealed by an arm support element of the armrest. This design makes it possible to achieve an advantageously secure connection of the armrest base body to the attachment module. Furthermore, this avoids fastening element being visible to and/or accessible by a passenger. Preferably, the arm support element is configured, when in the position of use, to be in direct contact with a passenger's arm. Preferably, the arm support element is realized as a comfort element. Preferably, the armrest base body, in particular in the fully installed state, is connected to the attachment module in a force-fitting and/or form-fitting manner. Preferably, the armrest base body can be connected via the at least one fastening element in an installation state in which the arm support element is not coupled to the armrest base body. Alternatively, it is conceivable that the armrest base body can be connected to the attachment module by means of at least one latching connection.

It is additionally proposed that the attachment module in the attachment space of the armrest be delimited by lateral walls of the armrest base body and be at least largely concealed. This design makes it possible to achieve advantageously simple and stable supporting of the attachment module in the armrest base body. Furthermore, with this design, it can be ensured that the attachment module is not visible to a passenger, at least substantially. Preferably, the lateral walls of the armrest base body delimit the attachment space on at least two sides. Preferably, the attachment module, in the fully installed state, in particular in the attachment space, bears against the lateral walls of the armrest base body. Preferably, the attachment module, in the fully installed state, in particular in a side view of the aircraft seat device, is at least largely concealed by the armrest base body. The term "at least largely" is preferably to be understood to mean by at least 60%, preferably at least 75%, particularly preferably at least 90% and very particularly preferably at least 95% of a volume of the attachment module.

It is furthermore proposed that the armrest, in an attachment region of the armrest, have lateral outer faces that are fully closed and formed by the armrest base body. With this design, an advantageously closed surface of the armrest base body can be provided. Thus, advantageously simple fabrication can be effected. Furthermore, advantageously, this design means that the armrest is easy to clean. Furthermore, advantageously, this design means that there is no need for additional cover elements. Preferably, the lateral walls of the armrest base body form the lateral outer faces. An "attachment region of the armrest" is preferably to be understood to mean a region, in particular in a side view of the aircraft seat device, in which the armrest base body and the attachment module overlap in the fully installed state. The term "fully closed" is preferably be understood to mean that the lateral outer faces are realized without interruption of a continuous surface, in particular that the lateral outer faces are not interrupted by cutouts and/or steps. Preferably, the armrest, in particular the armrest base body, is without at least one laterally arranged cover element in the attachment region of the armrest. A "cover element" is preferably to be understood to mean a separate component that is connected to the armrest, in particular to the armrest base body, in addition to a, in particular lateral, cover of the armrest.

It is also proposed that the attachment module have at least one attachment base body that, in the fully installed state, is at least substantially received in the armrest base body. This design makes the attachment module particularly advantageous for installing the armrest. Preferably, the at least one attachment base body, in the fully installed state, is connected to the armrest base body in a force-fitting and/or form-fitting manner. Preferably, the armrest base body is connected to the at least one attachment base body by means of the at least one fastening element. Preferably, the at least one attachment base body, in the fully installed state, is received, at least substantially, in the attachment space of the armrest. Preferably, the at least one attachment base body is in the form of a plate.

It is additionally proposed that the attachment module have a pivot bearing unit, which is connected to the at least one attachment base body and via which the attachment module is pivotably supported on the seat divider. This design allows the attachment module to be advantageously supported on the seat divider. Furthermore, this design allows advantageously simple installation of the attachment module on the seat divider. Preferably, the attachment module is supported so as to be pivotable with respect to the seat divider in an angular range between the position of use and the position of non-use. Preferably, the seat divider has a pivot bearing. Preferably, the pivot bearing unit of the attachment module is connected to the pivot bearing of the seat divider. Preferably, the pivot bearing unit of the attachment module engages in a form-fitting and/or force-fitting manner in the pivot bearing of the seat divider. Preferably, the pivot bearing unit is configured to be pushed into the seat divider and secured in a form-fitting manner in the seat divider.

It is furthermore proposed that the attachment module have at least one slotted guide, in which at least one stop element of the seat divider is arranged and which forms a first end stop for the position of use and a second end stop for the position of non-use. This design allows the pivot kinematics of the aircraft seat device to be advantageously integrated into the attachment module. This makes it possible to provide an armrest that is advantageously simple in design and easy to install. Preferably, the stop element is realized as a bolt. Preferably, the slotted guide is arranged along a circular arc portion, about a pivot axis of the armrest.

It is also proposed that the at least one slotted guide be arranged in the at least one attachment base body. This design makes it possible for the armrest to be attached to the seat divider in an advantageously stable manner. Preferably, the slotted guide is realized as a slot that breaches the at least one attachment base body.

It is additionally proposed that the armrest base body be realized in a one-part implementation, in particular integrally. This design makes it possible to achieve advantageously simple and cost-effective fabrication of the aircraft seat device. Furthermore, rapid and clearly arranged installation of the aircraft seat device can be achieved. The term "in a one-part implementation" is preferably to mean formed in one piece. Preferably, this one piece is fabricated from a single blank, a mass and/or a casting, particularly preferably in an injection molding process.

It is furthermore proposed that an inner space of the armrest between the armrest base body and the arm support element do not have an additional support structure. This design allows advantageously simple fabrication and installation of the armrest. Furthermore, an advantageously weight-optimized armrest can be provided. This design also allows a particularly advantageous routing of at least one cable that is realized, in particular, as a Bowden cable, to be effected in an inner space of the armrest. An "inner space of the armrest" is preferably be understood to mean a space that is delimited by the armrest itself toward an environment. Preferably, the inner space of the armrest is delimited by the armrest base body and by the arm support element. A "support structure" is preferably to be understood to mean a component structure, in particular a component, that is primarily configured to transfer forces and/or torques that result from supporting of the passenger on the armrest. Preferably, the armrest base body is realized as a support structure that is configured to divert into the seat divider support forces that are directed into the armrest. Preferably, the armrest base body is U-shaped over a large part of a longitudinal extent of the armrest base body. Preferably, the armrest, in the inner space of the armrest, in which the armrest base body is in particular U-shaped, has a continuous obstacle-free cavity, which is in particular without at least one reinforcing rib, along the longitudinal extent of the armrest base body. Preferably, in a region in which the armrest base body is U-shaped, the armrest base body preferably transfers to the seat divider at least 75%, preferably at least 80% and particularly preferably at least 90% of the support forces directed into the armrest.

It is also proposed that the armrest base body be made at least substantially of a fiber-reinforced plastic. This design makes it possible to provide an advantageously weight-optimized armrest. Preferably, the fiber-reinforced plastic comprises at least one reinforcing fiber, preferably a multiplicity of reinforcing fibers. Preferably, the reinforcing fibers are carbon fibers, glass fibers and/or aramid fibers. In principle, the reinforcing fibers could also be made of another fiber material considered suitable by a person skilled in the art. Preferably, the reinforcing fibers are bundled in at least one roving.

It is additionally proposed that the armrest base body have a plastic matrix and at least one preform, which in particular is fabricated by means of a tailored fiber placement process, embedded in the plastic matrix. This design makes it possible to provide an armrest base body that is advantageously optimized in respect of force flow. An advantageously weight-optimized armrest can thus be provided. Furthermore, with this design, an advantageously cost-effective and reproducible fabrication can be achieved. Preferably, the plastic matrix is realized as a thermosetting plastic. Preferably, the plastic matrix is formed from a synthetic resin, in particular an epoxy resin. A "preform" is preferably to be understood to mean a semi-finished product that has a plurality of reinforcing fibers, in particular at least one roving. A "tailored fiber placement process" is preferably to be understood to mean a fabrication process in which the reinforcing fibers, in particular the at least one roving, are deposited and fixed along load paths of a component, in particular the armrest base body. Preferably, the at least one preform is configured to be produced in two dimensions. Preferably, the at least one preform comprises at least one embroidery base and a multiplicity of reinforcing fibers, which in particular are bundled in a roving. Preferably, the roving is fixed on the at least one embroidery base by means of at least one embroidery thread of the preform. Preferably, the roving is arranged in lengths on the embroidery base, along load paths of the armrest base body. Alternatively, it would be conceivable for the preform to comprise at least one fiber mesh and/or at least one fiber fabric. The term "embedded" is preferably to be understood to mean that the preform is impregnated by means of the plastic matrix and is at least substantially completely wetted by the plastic matrix. Alternatively, the at least one preform may also be fabricated by means of a weaving process and/or a braiding process.

It is furthermore proposed that the armrest base body be fabricated by means of a resin transfer molding process, wherein the preform is configured to be embedded into the plastic matrix during the resin transfer molding process. This design allows the armrest base body to be fabricated in an advantageously reproducible manner. Furthermore, with this design, a particularly advantageous surface of the armrest base body can be created. Preferably, a method for fabricating the armrest base body comprises a method step in which the at least one preform is fabricated by means of the tailored fiber placement process. Preferably, the method for fabricating the armrest base body comprises a further method step, which follows the method step and in which the at least one preform is embedded into the plastic matrix by means of the resin transfer molding process. Preferably, the preform is configured to be reshaped during a draping process or during the resin transfer molding process. A "resin transfer molding process" is preferably to be understood to mean a fabrication process in which the at least one preform is inserted into at least one mold into which the plastic matrix, in particular a resin-hardener mixture, is injected under an injection pressure, the at least one preform being saturated by the plastic matrix. Preferably, a blank body of the armrest base body can be removed from the at least one mold after curing. Preferably, the blank body of the armrest base body is configured to be painted. Preferably, the armrest base body has a paint finish, in particular on the outside. Alternatively, however, it would also be conceivable for the armrest base body to have no paint finish, in particular on the outside. Preferably, the armrest base body is realized as a visible component. In principle, it would also be conceivable for a film to be materially bonded to the blank body of the armrest base body, for example by means of a deep-drawing process in which a film is applied to the armrest base body. In principle, it is also conceivable for a film and/or a coating of the armrest base body, in particular as an alternative to a paint finish of the raw body of the armrest base body, to be applied to the armrest base body during a process of shaping of the armrest base body, in particular during an in-mold coating process. Preferably, the armrest base body does not have a cover element that can be removed, in particular non-destructively, and/or a film that can be removed, in particular non-destructively. Preferably, it is not possible to replace a surface of the armrest base body, in particular an outer face, without damaging the armrest base body and/or completely replacing the armrest base body. In principle, it would also be conceivable for the armrest base body to be fabricated by means of a vacuum infiltration process, with the preform being configured to be embedded into the plastic matrix during the vacuum infiltration process. Alternatively, it would also be conceivable for the armrest base body to be fabricated by means of a wet compression molding process, with the preform being configured to be embedded into the plastic matrix during the wet compression molding process. In principle, it would also be conceivable for the plastic matrix to be realized as a thermoplastic.

It is also proposed that the armrest be pivotable via two pivot axes that are aligned parallel to each other and spaced apart from each other. This design allows an advantageously large degree of pivoting of the armrest to be achieved. This design also allows the armrest to be advantageously pivoted out of a back support region when a backrest adjacent to the armrest is being pivoted. Preferably, the armrest has a pivot axis and a further pivot axis. Preferably, the pivot axis is formed by the pivot bearing of the seat divider, which pivot bearing is coupled to the pivot bearing unit of the attachment module. Preferably, the further pivot axis is formed by a further pivot bearing of the seat divider. Preferably, the seat divider is of a multipart design. Preferably, the seat divider has a pivot carrier element. Preferably, at least a large part of the pivot carrier element is arranged between the pivot axis and the further pivot axis. Preferably, the pivot carrier element is configured to pivot the pivot bearing of the seat divider, in particular the pivot axis, relative to the further pivot axis. Preferably, the pivot bearing of the seat divider is directly connected to the pivot carrier element. Preferably, the attachment module is pivotably connected to the pivot carrier element. Preferably, the pivot carrier element is pivotable via the further pivot axis, in particular relative to the stand unit.

It is additionally proposed that the armrest be pivotable by at least 110 degrees, in particular by at least 120 degrees, from the position of use to the position of non-use and/or a further position of non-use. This design allows an advantageously large degree of pivoting of the armrest to be achieved. This design also allows the armrest to be advantageously pivoted out of a back support region when a backrest adjacent to the armrest is pivoted. Preferably, the armrest can be pivoted by up to 128 degrees from the position of use to the further position of non-use. A "further position of non-use" is preferably to be understood to mean a position of non-use in which the pivot carrier element is pivoted relative to the position of use of the armrest. Preferably, the pivot carrier element is arranged in the same position in both the position of non-use and in the position of use. Preferably, the pivot carrier element, when in the further position of non-use, is pivoted with respect to this same position. Preferably, the armrest is configured to first be pivoted, via the pivot axis, from the position of use to the position of non-use. Preferably, the armrest is configured to then be pivoted by means of the pivot carrier element, via the further pivot axis, from the position of non-use to the further position of non-use.

It is furthermore proposed that a distance of the pivot axis of the armrest from an underside of the armrest base body, in particular in the position of use, be less than a distance of the pivot axis of the armrest from an upper side of the arm support element. This design makes it possible to effect a particularly advantageous pivoting of the armrest with respect to the seat divider. This design allows the armrest to be pivoted about the pivot bearing of the seat divider in a particularly advantageous manner. As a result, the armrest, when pivoted from the position of use to the position of non-use, can be moved to an advantageous extent out of a back support region. An "underside of the armrest base body" is preferably to be understood to mean a point or a region of the armrest base body that, in particular when the armrest is in the position of use, is at the shortest distance from the stand plane. An "upper side of the arm support element" is preferably to be understood to a point or a region of the arm support element that, when the armrest is in the position of use, is at a maximum distance from the stand plane.

It is also proposed that the aircraft seat device comprise at least one cable channel that, starting from the armrest base body, extends through the attachment module into the seat divider. With this design, a cable routed through the armrest can easily be integrated, advantageously, into the aircraft seat device. Furthermore, this design means that the installation of cables can be effected in an advantageously simple and defined manner. Preferably, the at least one cable channel is routed in at least one portion through the seat divider. Preferably, the at least one cable channel is routed in the at least one portion from a rear side of the seat divider to a front side of the seat divider. Preferably, the at least one cable channel is configured to receive at least one cable. Preferably, the at least one cable is realized as a Bowden cable or as an electrical line. Preferably, the at least one cable is configured to transfer at least one mechanical and/or electronic actuation signal and/or operating signal, for example for the purpose of adjusting a backrest and/or a leg rest and/or for the purpose of operating an in-flight entertainment system. Preferably, the armrest has at least one actuating element and/or operator-controlled element. Preferably, the at least one actuating element and/or operator-controlled element is functionally coupled to the at least one cable. Preferably, the at least one actuating element and/or operator-controlled element is fastened to the armrest base body.

It is additionally proposed that the aircraft seat device have an indentation that, in the position of use, is arranged directly on a front side of the seat divider, beneath the armrest base body. This design can advantageously prevent fingers from being trapped, in particular when the armrest is pivoted from the position of non-use to the position of use. With this design, finger pinching can advantageously be avoided without the need to provide an additional cover part directly on the front side of the seat divider, beneath the armrest base body. In this context, "arranged beneath the armrest base body" is preferably to be understood to mean that the indentation is arranged at a location on the armrest base body directly in front of the front side of the seat divider, the indentation being arranged at this location directly beneath the armrest base body. Preferably, the indentation, in particular when the armrest is in the position of use, is concealed by the armrest base body when viewed from the side of the aircraft seat device.

Furthermore, a method for installing the aircraft seat device is proposed, wherein, in a method step, the attachment module is coupled to the seat divider, and wherein, in a further method step that follows the method step, the armrest base body is coupled to the attachment module. With this design, fabrication of the aircraft seat device can be effected in an advantageously simple and efficient manner. Furthermore, this design allows servicing and/or replacement of the armrest to be effected quickly and easily. Preferably, in the method step, the attachment module is attached to the seat divider. Preferably, in the method step, the pivot bearing unit of the attachment module is connected to the pivot bearing of the seat divider. Preferably, in the method step, the at least one attachment base body is connected to the pivot bearing unit of the attachment module, in particular in a rotationally fixed manner. Preferably, following the method step, the attachment module is pivotably supported on the seat divider. Preferably, in the method step, the armrest is separated from the attachment module and the seat divider. Preferably, in the further method step, the armrest is connected to the attachment module. Preferably, in the further method step, the armrest, in particular the armrest base body, is pushed onto the attachment module. Preferably, in the further method step, the attachment module is pushed into the armrest, in particular into the armrest base body. Preferably, following the further method step, the armrest, in particular the armrest base body, is pivotably connected to the seat divider via the attachment module.

Additionally proposed is a method for the fabrication of an armrest base body, wherein, in a first method step, in a tailored fiber placement process (TFP process) a preform is fabricated from an embroidery base having fiber mats or fiber bundles embroidered thereon. The embroidery base of the preform is formed by a fiber mat, preferably a glass fiber mat. The fiber mats or fiber bundles embroidered onto the embroidery base are embroidered, in particular, in the regions where forces are transmitted during use of the armrest base body. Preferably, a preform that has different wall thicknesses in different regions is fabricated by the TFP process.

The aircraft seat device according to the invention and the method according to the invention are not intended in this case to be limited to the application and embodiment described above. In particular, in order to fulfill an operating principle described herein, the aircraft seat device according to the invention and the method according to the invention may have a number of individual elements, components, units and/or method steps that differs from the number of elements, components, units and/or method steps described herein.

DRAWINGS

Further advantages are evident from the following description of the drawings. Three exemplary embodiments of the invention are represented in the drawings. The drawings, the description and the claims contain numerous features in combination. A person skilled in the art will also usefully consider the features individually and combine them to form further useful combinations.

Figure 2:
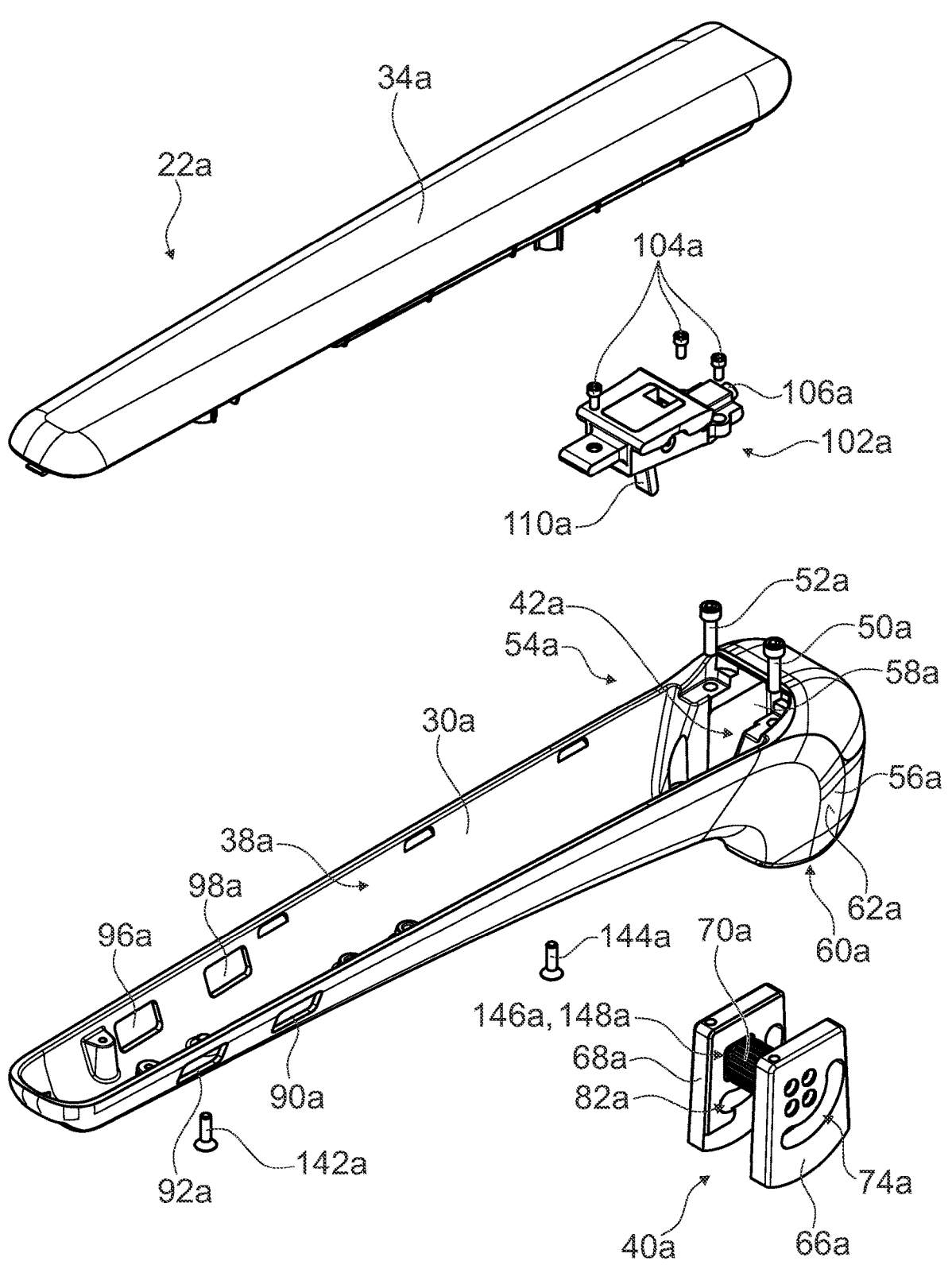
Figure 3:
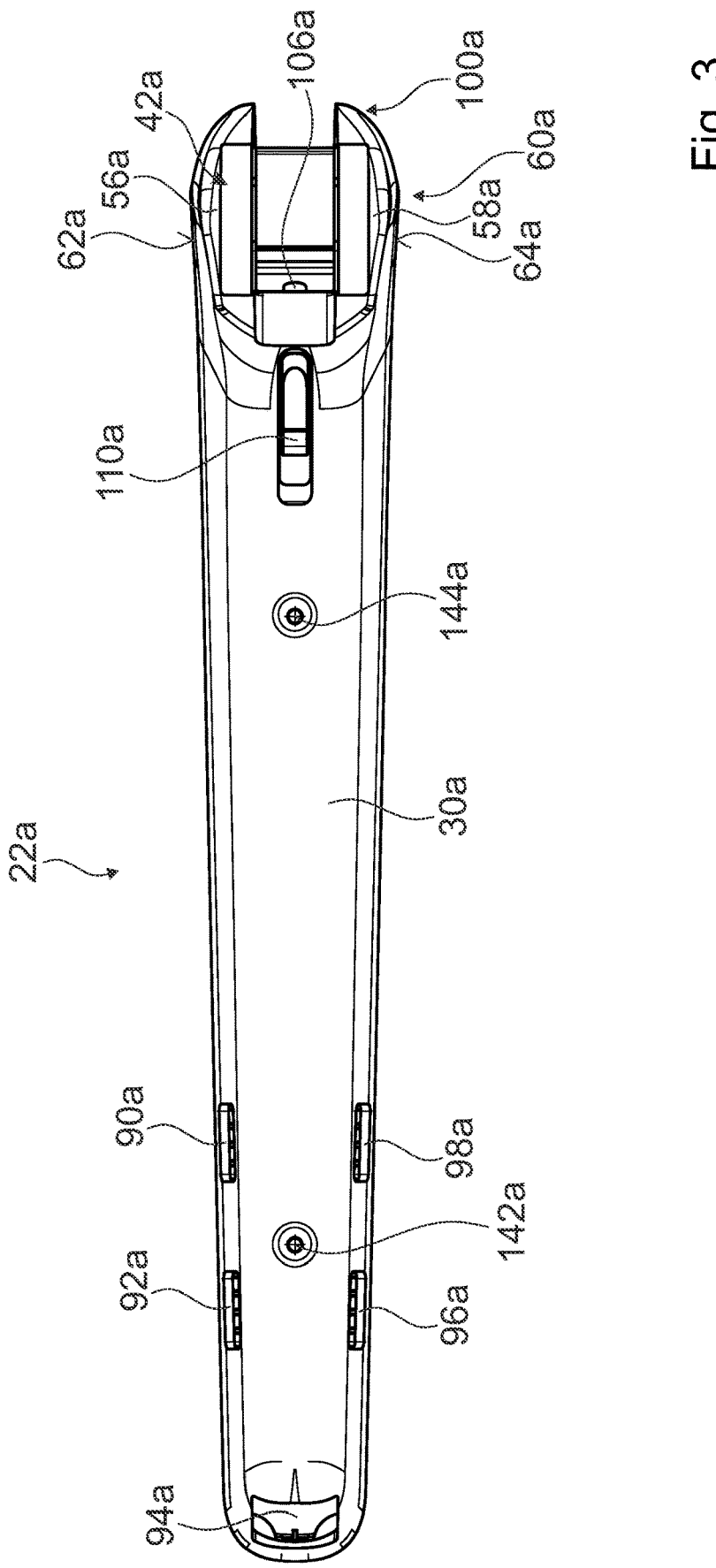
Figure 4:
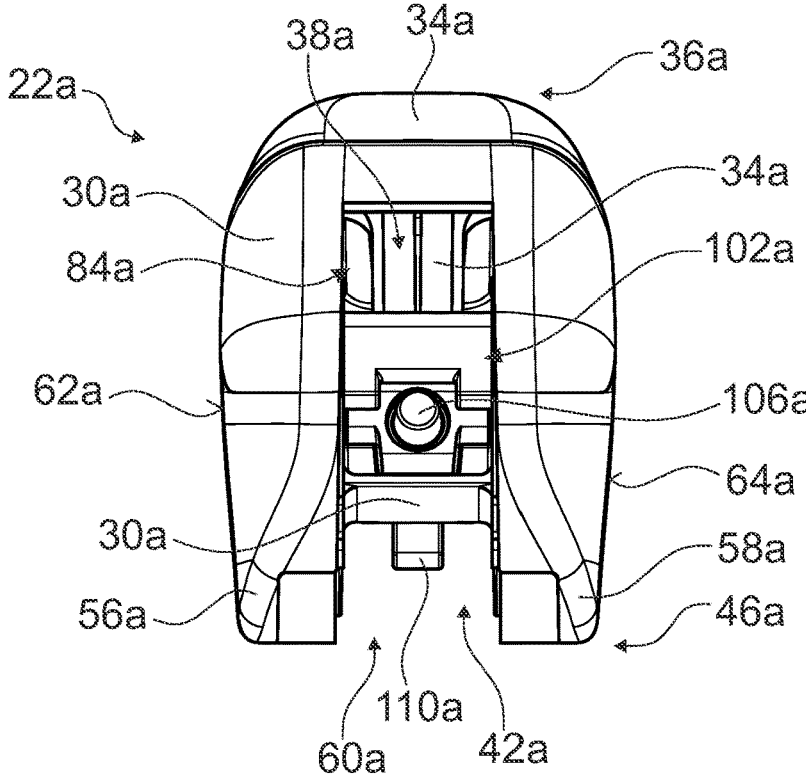
Figure 5:
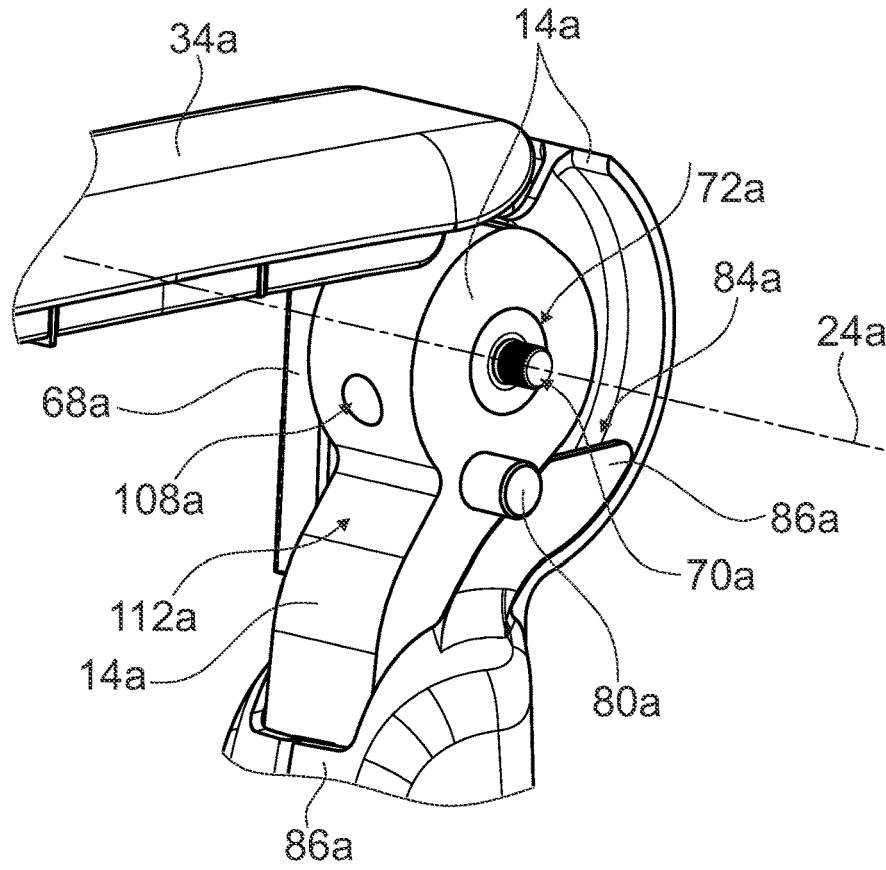
Figure 6:
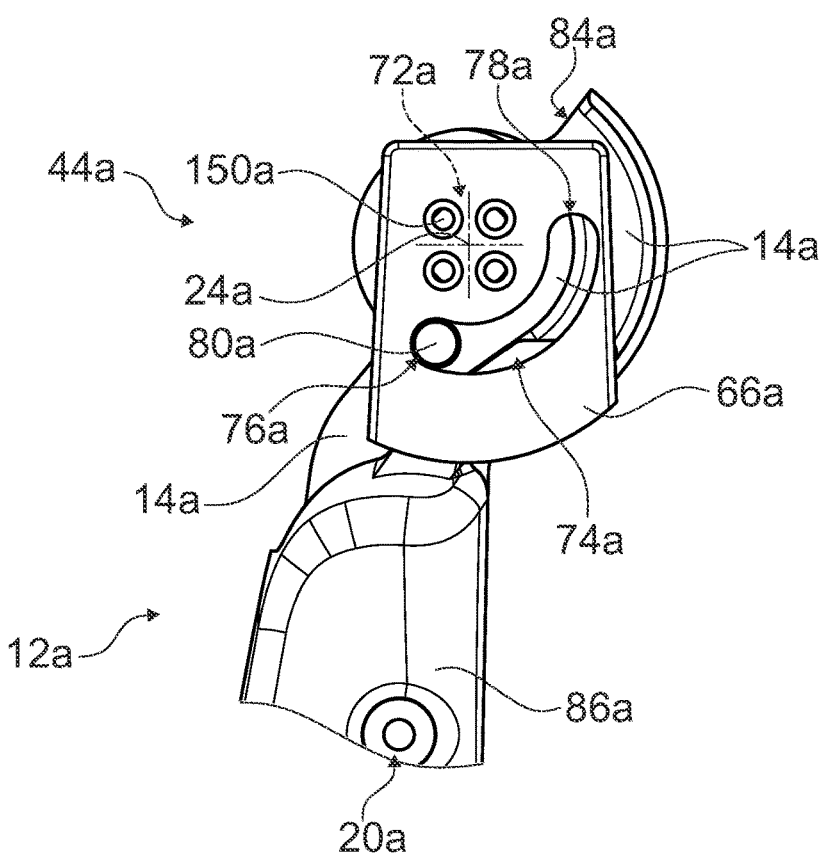
Figure 7:
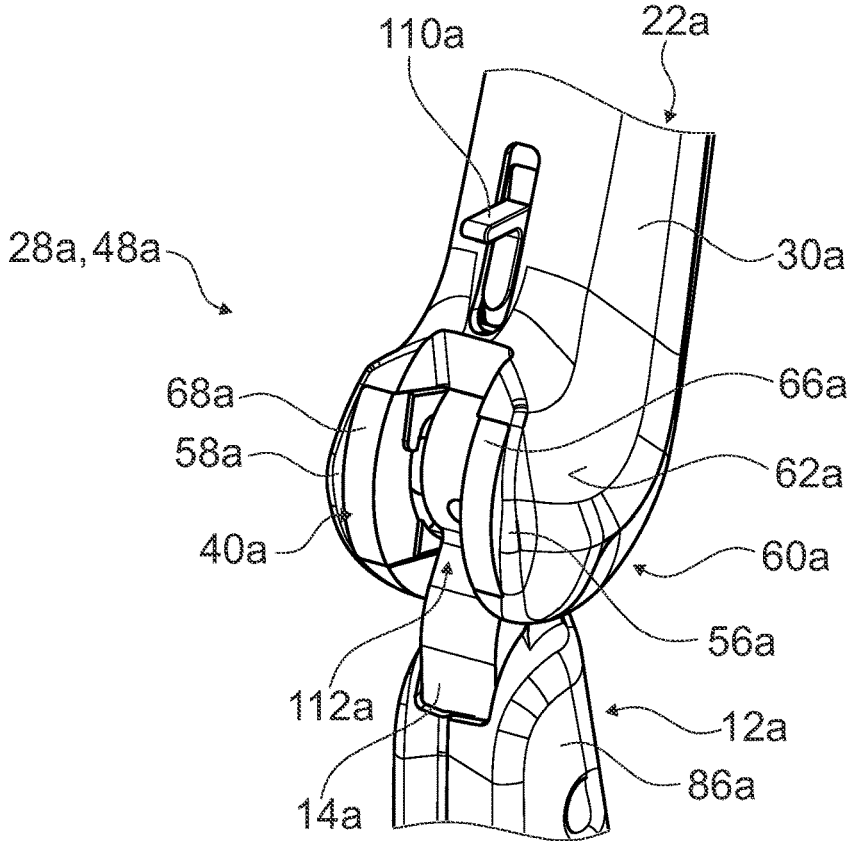
Figure 8:
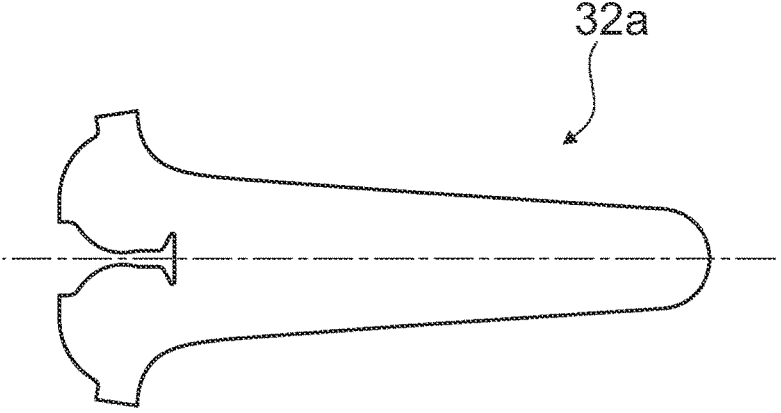
Figure 9:
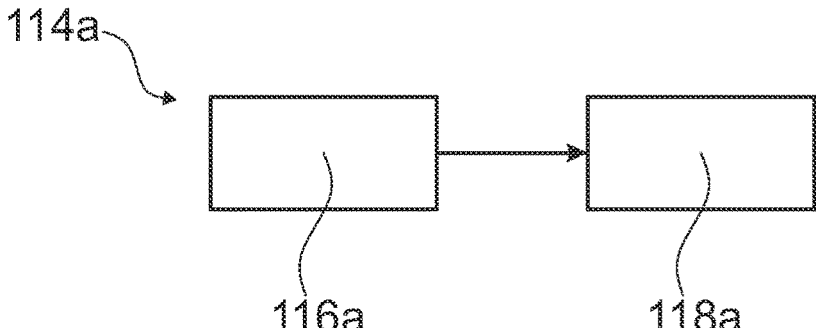
Figure 10:
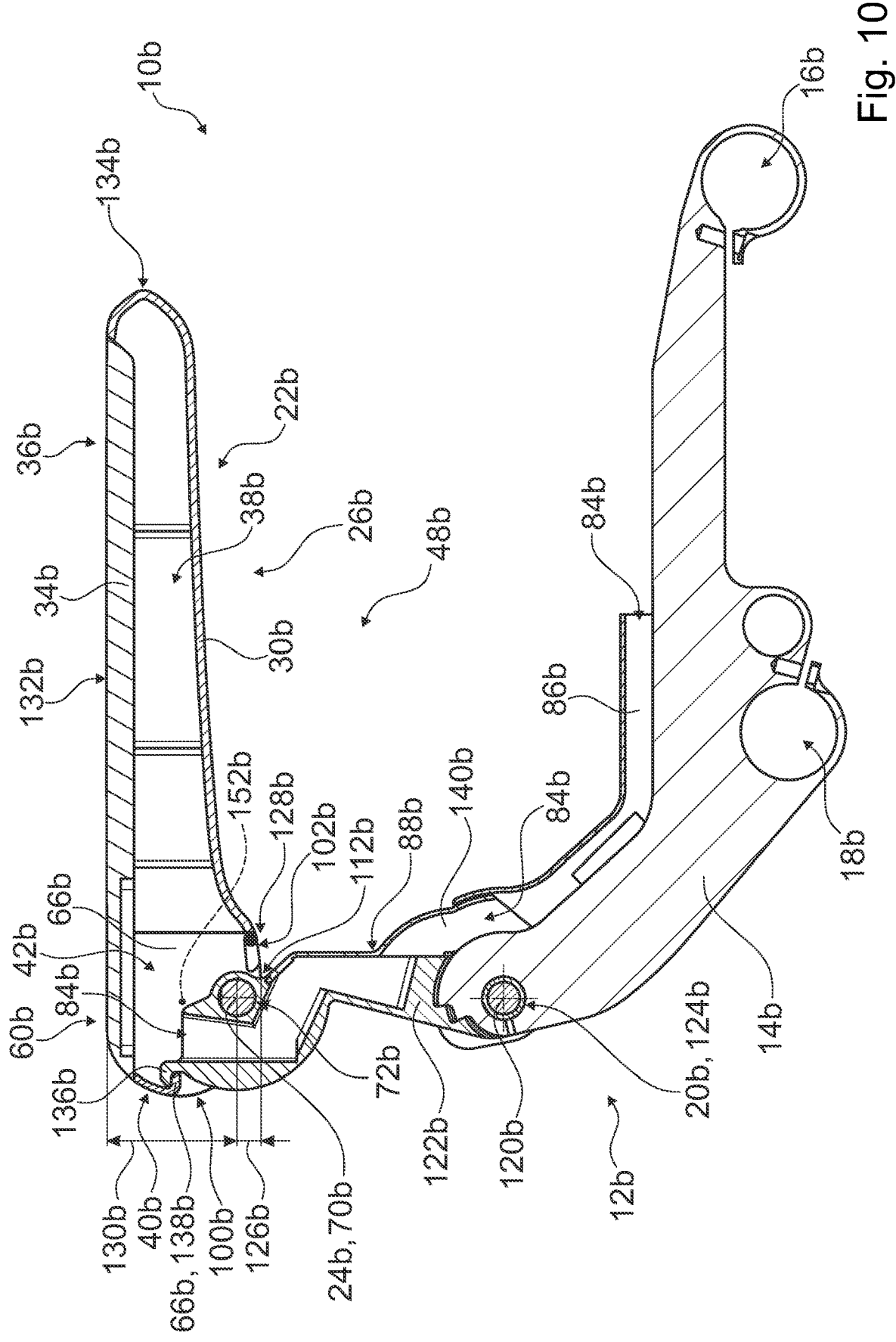
Figure 11:
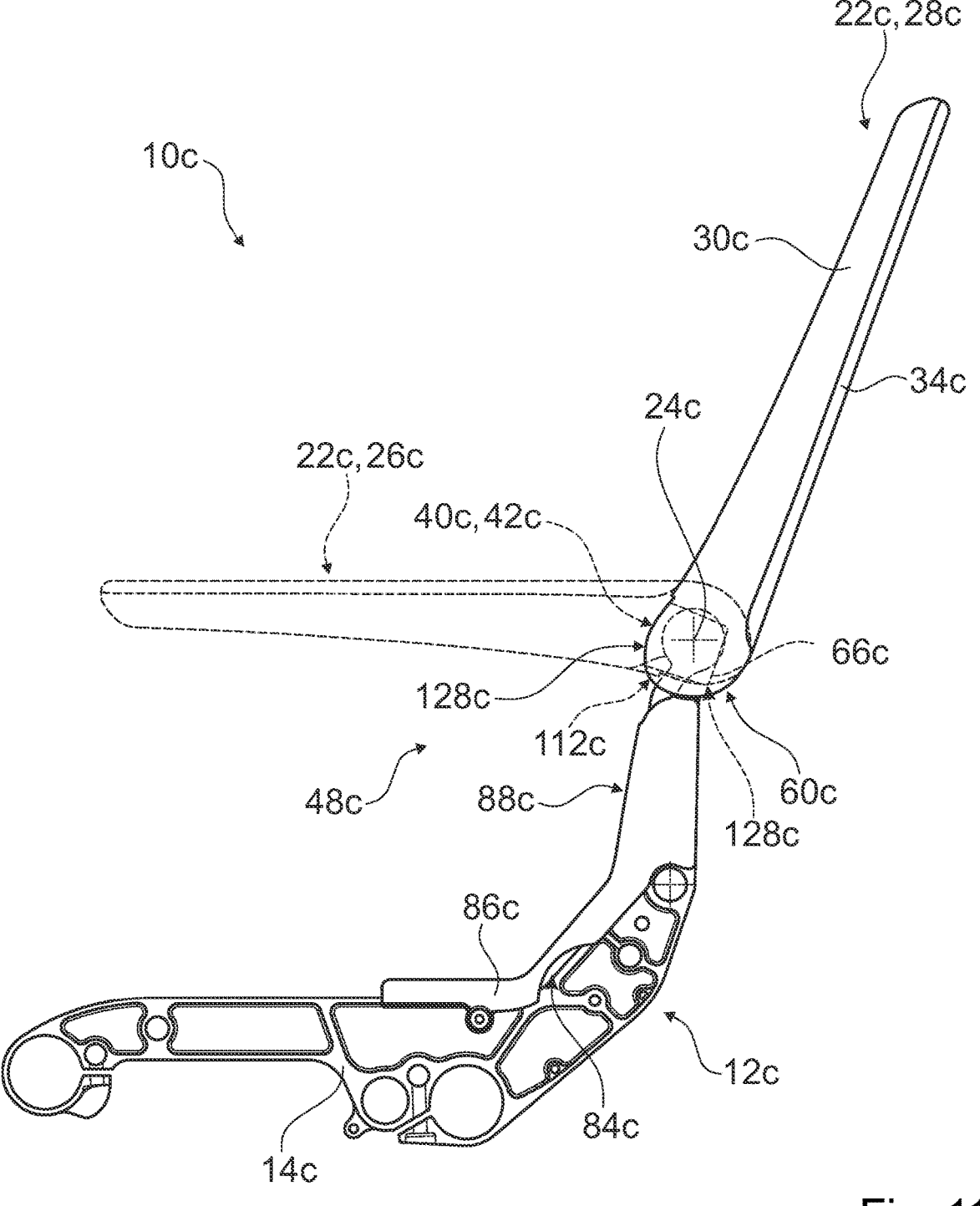

In the drawings:

FIG. 1 shows a schematic side view of an aircraft seat device according to the invention in a position of use, in a first exemplary embodiment, FIG. 2 shows a schematic representation of an armrest and of an attachment module of the aircraft seat device according to the invention, in the first exemplary embodiment, FIG. 3 shows a schematic bottom view of the armrest, in the first exemplary embodiment, FIG. 4 shows a schematic rear view of the armrest, in the first exemplary embodiment, FIG. 5 shows a schematic representation of an attachment region of an attachment region of the aircraft seat device according to the invention, in the first exemplary embodiment, FIG. 6 shows a schematic side view of a seat divider of the aircraft seat device according to the invention and of the attachment module, in the first exemplary embodiment, FIG. 7 shows a schematic representation of the aircraft seat device according to the invention in a position of non-use, in the first exemplary embodiment, FIG. 8 shows a schematic representation of a preform of the aircraft seat device according to the invention, in the first exemplary embodiment, FIG. 9 shows a schematic representation of a method according to the invention for installing the aircraft seat device, in the first exemplary embodiment, FIG. 10 shows a schematic sectional representation of an aircraft seat device according to the invention in a position of use, in a second exemplary embodiment, and FIG. 11 shows a schematic side view of an aircraft seat device according to the invention in a position of use and in a position of non-use, in a third exemplary embodiment.

DESCRIPTION OF THE EXEMPLARY EMBODIMENTS

FIGS. 1 to 8 show an aircraft seat device 10a in a first exemplary embodiment. The aircraft seat device 10a is part of an aircraft seat, not represented in greater detail, and/or a row of aircraft seats, not represented in greater detail, that comprises at least two aircraft seats. The aircraft seat device 10a comprises a stand unit via which the aircraft seat device 10a, in particular the at least one aircraft seat, can be erected on a stand plane.

The aircraft seat device 10a comprises a seat divider 12a. The seat divider 12a is configured to be arranged laterally next to a seat base of an aircraft seat and/or between seat bases of two aircraft seats. The seat divider 12a has a carrier element 14a. The carrier element 14a of the seat divider 12a is realized in a one-part implementation. The seat divider 12a is connected to the stand unit. The seat divider 12a is connected to support tubes of the stand unit, which are not represented in detail. The seat divider 12a has at least two attachment points 16a, 18a, by means of which the seat divider 12a is connected to the stand unit, in particular to two support tubes of the stand unit. The seat divider 12a has a bearing point 20a on which a backrest of an aircraft seat can be supported, in particular in a pivotable manner.

The aircraft seat device 10a comprises an armrest 22a. The armrest 22a has a pivot axis 24a. The armrest 22a is supported so as to be pivotable about the pivot axis 24a. The armrest 22a is pivotable between a position of use 26a and a position of non-use 28a with respect to the seat divider 12a. In the position of non-use 28a, the armrest 22a is pivoted to a maximum with respect to the position of use 26a. The carrier element 14a of the seat divider 12a extends from the support tubes of the stand unit to the armrest 22a.

The armrest 22a has an armrest base body 30a. The armrest base body 30a is configured to divert support forces acting upon the armrest 22a, in particular resulting from bearing contact of a passenger's arm, into the seat divider 12a. The armrest base body 30a is realized in a one-part implementation, in particular integrally. The armrest base body 30a is made at least substantially of a fiber-reinforced plastic. The fiber-reinforced plastic comprises a multiplicity of reinforcing fibers. In the present case, the reinforcing fibers are realized as carbon fibers. In principle, however, the reinforcing fibers may also be realized as glass fibers, aramid fibers or any other fiber material considered suitable by a person skilled in the art. The reinforcing fibers are bundled in at least one roving. The armrest base body 30a has a plastic matrix. In the present case, the plastic matrix is realized as a thermosetting plastic. The plastic matrix is formed from a synthetic resin, in particular an epoxy resin. The armrest base body 30a has a preform 32a embedded into the plastic matrix (see FIG. 8). In the present case, the preform 32a is fabricated by means of a tailored fiber placement process (TFP). In the tailored fiber placement process, the at least one roving is deposited and fixed along load paths of the armrest base body 30a. The preform 32a is configured to be produced in two dimensions. The preform 32a comprises an embroidery base. The embroidery base is realized as an innermost layer of the preform 32a. The embroidery base is realized as a glass fiber mat. As a result, the preform 32a and then also the finished armrest base body 30a form an advantageous electrically insulated inner layer.

This allows the armrest base body 30$a$, advantageously, to be of an electrically insulated design. The preform 32$a$ comprises a multiplicity of reinforcing fibers, which are bundled in the at least one roving. The at least one roving is arranged in lengths on the embroidery base, along load paths of the armrest base body 30$a$. The at least one roving is fixed on the embroidery base by means of at least one embroidery thread of the preform 32$a$. The preform 32$a$ is realized substantially as a development of the dimensions of the armrest base body 30$a$. In principle, it would also be conceivable for lighting elements, such as LEDs in particular, to be inserted into the preform. Illumination can thus be integrated into the armrest base body 30$a$ in a particularly simple and straightforward manner.

Alternatively or additionally, it would be conceivable for the preform 32$a$ to comprise at least one fiber mesh and/or at least one fiber fabric. Alternatively, the at least one preform 32$a$ may also be fabricated by means of a weaving process, a braiding process and/or a knitting process.

The armrest base body 30$a$ is fabricated by means of a resin transfer molding (RTM) process. The preform 32$a$ is configured to be embedded into the plastic matrix during the resin transfer molding process. A method for the fabrication of the armrest base body 30$a$ comprises a first method step in which the preform 32$a$ is fabricated by means of the tailored fiber placement process (TFP process). In the first method step, which is realized as a TFP method step, the preform 32$a$ is formed by applying, in particular embroidering, fiber mats onto an embroidery base, preferably realized as a glass fiber mat. The fiber mats are laid out, in particular, along the subsequent load paths of the armrest base body 30$a$. In regions subject to high loads such as, for instance, in the region of the bearing points, more fiber bundles are preferably integrated into the preform 32$a$. By selective laying-out of the fiber bundles, the preform 32$a$ and thus the armrest base body 30$a$ can be realized particularly easily, as corresponding fiber bundles are only laid out where they are needed. The method for the fabrication of the armrest base body 30$a$ comprises a further method step, which follows the first method step and in which the preform 32$a$ is embedded into the plastic matrix by means of the resin transfer molding process. The preform 32$a$ is configured to be reshaped during a draping process or during the resin transfer molding process. In the resin transfer molding process, the preform 32$a$ is inserted into at least one mold, into which the plastic matrix, in particular a resin-hardener mixture, is injected under an injection pressure, the preform 32$a$ being saturated with the plastic matrix. A blank body of the armrest base body 30$a$ can be removed from the at least one mold after curing. The blank body of the armrest base body 30$a$ is configured to be painted. The armrest base body 30$a$ has a paint finish, in particular on the outside. Alternatively, however, it would also be conceivable for the armrest base body 30$a$ to have no paint finish, in particular on the outside. In this case, the armrest base body 30$a$ would be realized as a visible component. In principle, it would also be conceivable for a film to be materially bonded to the blank body of the armrest base body 30$a$, for example by means of a deep-drawing process in which a foil is applied to the armrest base body 30$a$. In principle, it is also conceivable for film and/or a coating of the armrest base body 30$a$, in particular as an alternative to painting the blank body of the armrest base body 30$a$, to be applied to the armrest base body 30$a$ during a process of shaping the armrest base body 30$a$, in particular during an in-mold coating process. The armrest base body 30$a$ does not have a cover element that can be removed, in particular non-destructively, and/or a film that can be removed, in particular non-destructively. It is not possible to replace a surface of the armrest base body 30$a$, in particular an outer face, without damaging the armrest base body 30$a$ and/or completely replacing the armrest base body 30$a$.

In principle, it would also be conceivable for the armrest base body 30$a$ to be fabricated by means of a vacuum infiltration process, with the preform 32$a$ being configured to be embedded into the plastic matrix during the vacuum infiltration process. In principle, it would also be conceivable for the armrest base body 30$a$ to be fabricated by means of a prepreg material. In principle, it would also be conceivable for the plastic matrix to be realized as a thermoplastic material.

The armrest 22$a$ has an arm support element 34$a$. The arm support element 34$a$ is configured, when in the position of use 26$a$, to be in direct contact with a passenger's arm. The arm support element 34$a$ is realized as a comfort element. The arm support element 34$a$ is arranged on an upper side 36$a$ of the armrest 22$a$. The aircraft seat device 10$a$ includes a fully installed state 48$a$. The arm support element 34$a$, in the fully installed state 48$a$, is fixedly connected to the armrest base body 30$a$. The arm support element 34$a$, in the fully installed state 48$a$, is connected to the armrest base body 30$a$ in a force-fitting and/or form-fitting manner. In the present case, the arm support element 34$a$ is connected to the armrest base body 30$a$ by means of two fastening element 142$a$, 144$a$. The fastening element 142$a$, 144$a$ are each realized as a screw. The fastening element 142$a$, 144$a$ are each screwed from an underside 46$a$ of the armrest 22$a$, through the armrest base body 30$a$, into the arm support element 34$a$. The aircraft seat device 10$a$ comprises the fastening element 142$a$, 144$a$. The armrest base body 30$a$ is realized as a support structure, which is configured to divert into the seat divider 12$a$ support forces that are directed into the armrest 22$a$, in particular into the arm support element 34$a$.

The armrest 22$a$ has an inner space 38$a$. The inner space 38$a$ of the armrest 22$a$ is separated from the armrest 22$a$ toward an environment. The inner space 38$a$ of the armrest 22$a$ is delimited by the armrest base body 30$a$ and by the arm support element 34$a$. The inner space 38$a$ of the armrest 22$a$ between the armrest base body 30$a$ and the arm support element 34$a$ does not have an additional support structure. The armrest base body 30$a$ is U-shaped over a large part of a longitudinal extent of the armrest base body 30$a$, in particular when viewed in a cross-sectional plane that is orientated orthogonally to a longitudinal axis of the armrest 22$a$. In the inner space 38$a$ of the armrest 22$a$, in which the armrest base body 30$a$ is in particular U-shaped, the armrest 22$a$ has a continuous obstacle-free cavity, which is in particular without at least one reinforcing rib, along the longitudinal extent of the armrest base body 30$a$. In a region in which the armrest base body 30$a$ is U-shaped, the armrest base body 30$a$ transfers to the seat divider 12$a$ at least 80%, in particular at least 99%, of the support forces directed into the armrest 22$a$.

By means of the tailored fiber placement process and the resin transfer molding process, the armrest base body 30$a$ can be fabricated with advantageously thin wall thicknesses. Furthermore, by means of the tailored fiber placement process and the resin transfer molding process, the armrest base body 30$a$ can be fabricated with advantageously differing wall thicknesses. In the present case, the armrest base body 30$a$ has a wall thickness of at most 3 mm, preferably at most 2 mm, in a large part of the armrest base body 30$a$, in particular in a region in which the armrest base body 30$a$ is U-shaped. In the present case, the armrest base body 30*a* has a wall thickness in the attachment region 60*a* of the armrest 22*a*, in particular in a region of the lateral walls 56*a*, 58*a*, that is at least three times as great as the wall thickness in the region in which the armrest base body 30*a* is U-shaped. In the present case, the armrest base body 30*a* has a wall thickness of at least 8 mm, preferably at least 10 mm, in the attachment region 60*a* of the armrest 22*a*, in particular in a region of the lateral walls 56*a*, 58*a*, in particular at least in some regions. The tailored fiber placement process and the resin transfer molding process enable large wall thicknesses can be achieved, in particular using the same material, without sink marks occurring there. As a result, the armrest base body 30*a* can be produced, advantageously, with precision and dimensional accuracy and with an advantageously high surface quality.

The aircraft seat device 10*a* comprises an attachment module 40*a*. The attachment module 40*a* is pivotably connected to the seat divider 12*a*. The attachment module 40*a* is configured to support the armrest 22*a* so as to be pivotable with respect to the seat divider 12*a*. The attachment module 40*a* is configured to support the armrest 22*a* in a pivotable manner on the seat divider 12*a*. The attachment module 40*a* is supported so as to be pivotable with respect to the seat divider 12*a* in an angular range between the position of use 26*a* and the position of non-use 28*a*. The armrest 22*a* is pivotable by at least 110 degrees from the position of use 26*a* to the position of non-use 28*a*. In the present case, the angle range is 110 degrees. The armrest 22*a* has an attachment space 42*a*. The attachment module 40*a* is configured to be coupled to the armrest 22*a* in the attachment space 42*a* of the armrest 22*a*.

The attachment module 40*a* is configured, when in an installation state 44*a* in which the attachment module 40*a* is connected to the seat divider 12*a*, for coupling to the armrest base body 30*a*. The attachment module 40*a* is realized as an installation interface for the armrest 22*a*. The attachment module 40*a* is of a modular design. The attachment module 40*a* is configured to enable armrests of different designs to be coupled to the attachment module 40*a*. The armrests in this case each have the same interface for coupling with the attachment module 40*a*. The armrest base body 30*a*, when in the installation state 44*a* in which the attachment module 40*a* is connected to the seat divider 12*a*, can be installed on the attachment module 40*a*. The armrest 22*a*, in particular the armrest base body 30*a*, is configured, when in the installation state 44*a* in which the attachment module 40*a* is connected to the seat divider 12*a*, to be pushed onto the attachment module 40*a*. The attachment module 40*a* is configured, when in the installation state 44*a* in which the attachment module 40*a* is connected to the seat divider 12*a*, to be pushed into the armrest 22*a*, in particular into the attachment space 42*a* of the armrest 22*a*. When the armrest 22*a* is in the position of use 26*a*, the attachment space 42*a* of the armrest 22*a* is open toward the underside 46*a* of the armrest 22*a*. The attachment module 40*a* is configured, when in the installation state 44*a* in which the attachment module 40*a* is connected to the seat divider 12*a*, to be pushed from the underside 46*a* of the armrest 22*a* into the attachment space 42*a* of the armrest 22*a* in the direction of the upper side 36*a* of the armrest 22*a*. When the armrest base body 30*a* is positioned in an orientation as in the position of use 26*a*, a direction of connection of the attachment module 40*a* and the armrest 22*a* is at least substantially orthogonal to the stand plane. The armrest base body 30*a* can be removed from the attachment module 40*a* when in the installation state 44*a* in which the attachment module 40*a* is connected to the seat divider 12*a*. The armrest base body 30*a* is configured, when in the installation state 44*a* in which the attachment module 40*a* is connected to the seat divider 12*a*, to be removable from the attachment module 40*a*. The attachment module 40*a* does not have to be separated from the seat divider 12*a* in order to install and/or remove the armrest 22*a*.

The armrest base body 30*a*, in the fully installed state 48*a*, is coupled to the seat divider 12*a* via the attachment module 40*a*. The armrest 22*a*, in the fully installed state 48*a*, is fully installed on the seat divider 12*a* and can be used. The armrest base body 30*a*, in the fully installed state 48*a*, is connected to the seat divider 12*a* via the attachment module 40*a*. The attachment module 40*a*, in the fully installed state 48*a*, is received at least substantially in the attachment space 42*a* of the armrest 22*a*. The attachment space 42*a* is configured to receive the attachment module 40*a* in the armrest 22*a*. The attachment space 42*a* is formed by the armrest base body 30*a*. The attachment space 42*a* is delimited by an outer contour of the armrest base body 30*a*, in particular when viewed from the side of the aircraft seat device 10*a*. The side view corresponds to a direction of view along the pivot axis 24*a* of the armrest 22*a*. In the present case, the attachment module 40*a*, in the fully installed state 48*a*, is arranged entirely in the attachment space 42*a* of the armrest 22*a*. The attachment module 40*a*, in the fully installed state 48*a*, does not protrude beyond the outer contour of the armrest base body 30*a*.

The armrest base body 30*a*, in the fully installed state 48*a*, is connected to the attachment module 40*a* by means of two fastening element 50*a*, 52*a*. The fastening element 50*a*, 52*a* are each realized as a screw. The aircraft seat device 10*a* comprises the fastening element 50*a*, 52*a*. In principle, a number of fastening element 50*a*, 52*a* other than two would also be conceivable. The fastening element 50*a*, 52*a*, in the fully installed state 48*a*, are concealed by the arm support element 34*a* of the armrest 22*a*. The attachment module 40*a*, in the fully installed state 48*a*, is connected to the armrest base body 30*a* in a force-fitting and/or form-fitting manner. The attachment module 40*a*, in an installation state 54*a* in which the arm support element 34*a* is not coupled to the armrest base body 30*a*, can be connected to the armrest base body 30*a* via the fastening element 50*a*, 52*a*.

Alternatively, it is conceivable for the armrest base body 30*a* to be connectable to the attachment module 40*a* by means of at least one latching connection. In this case, the attachment module 40*a* and the armrest 22*a* could have mutually corresponding latching structures, configured to couple the armrest 22*a* to the attachment module 40*a* in a form-fitting manner.

The attachment module 40*a* is delimited in the attachment space 42*a* of the armrest 22*a* by lateral walls 56*a*, 58*a* of the armrest base body 30*a*. In the attachment space 42*a* of the armrest 22*a*, the attachment module 40*a* is concealed at least to a large extent by the lateral walls 56*a*, 58*a* of the armrest base body 30*a*. The lateral walls 56*a*, 58*a* of the armrest base body 30*a* delimit the attachment space 42*a* on at least two sides. In the fully installed state 48*a*, the attachment module 40*a* bears, in the attachment space 42*a*, against the lateral walls 56*a*, 58*a* of the armrest base body 30*a*. In the fully installed state 48*a*, the attachment module 40*a* is at least largely concealed by the armrest base body 30*a*, in particular when viewed from the side of the aircraft seat device 10*a*.

In the attachment region 60*a* of the armrest 22*a*, the armrest 22*a* has lateral outer faces 62*a*, 64*a* that are fully closed and formed by the armrest base body 30*a*. In the attachment region 60*a*, the armrest 22*a* is coupled to the attachment module 40a. In the attachment region 60a, the armrest 22a is coupled to the seat divider 12a. The attachment region 60a is realized as a rear region of the armrest 22a. The attachment region 60a extends by at most 10 cm away from the pivot axis 24a of the armrest 22a. The lateral walls 56a, 58a of the armrest base body 30a form the lateral outer faces 62a, 64a. The armrest base body 30a and the attachment module 40a, in the fully installed state 48a, overlap in the attachment region 60a of the armrest 22a, as viewed from the side of the aircraft seat device 10a. The lateral outer faces 62a, 64a are uninterrupted in the attachment region 60a. The pivot axis 24a of the armrest 22a intersects edges of the lateral outer faces 62a, 64a in the attachment region 60a. The armrest 22a, in particular the armrest base body 30a, is without at least one laterally arranged cover element in the attachment region 60a of the armrest 22a.

The attachment module 40a has an attachment base body 66a. The attachment base body 66a, in the fully installed state 48a, is received at least substantially in the attachment space 42a of the armrest 22a. The attachment base body 66a, in the fully installed state 48a, is received at least substantially in the armrest base body 30a. The attachment base body 66a is concealed in the attachment space 42a of the armrest 22a, at least to a large extent, by the lateral walls 56a, 58a of the armrest base body 30a. The attachment base body 66a, in the fully installed state 48a, is connected to the armrest base body 30a in a force-fitting and/or form-fitting manner. The armrest base body 30a is connected to the attachment base body 66a by means of one of the two fastening element 50a, 52a. The attachment base body 66a, in the fully installed state 48a, is received at least substantially in the attachment space 42a of the armrest 22a. The attachment base body 66a is in the form of a plate. A plane of main extent of the attachment base body 66a is orientated orthogonally to the pivot axis 24a. A "plane of main extent" of the attachment base body 66a is preferably to be understood to mean a plane that is parallel to a largest lateral face of a smallest notional cuboid that only just completely encloses the attachment base body 66a, and that in particular extends through the center of the cuboid.

The attachment module 40a has a further attachment base body 68a. The further attachment base body 68a is at least substantially identical in design to the attachment base body 66a. The further attachment base body 68a is symmetrical with respect to the attachment base body 66a. The further attachment base body 68a, in the fully installed state 48a, is arranged symmetrically with respect to the attachment base body 66a, in particular relative to the seat divider 12a. The attachment base body 66a and the further attachment base body 68a are supported so as to be pivotable, via the pivot axis 24a, relative to the seat divider 12a. In principle, it would also be conceivable for the attachment module 40a to have only the attachment base body 66a and for the further attachment base body 68a to be omitted.

The attachment module 40a has a pivot bearing unit 70a. Via the pivot bearing unit 70a, the attachment module 40a is supported in a pivotable manner on the seat divider 12a. The seat divider 12a has a pivot bearing 72a. The pivot bearing 72a forms the pivot axis 24a. The pivot bearing 72a of the seat divider 12a is integrated into the carrier element 14a of the seat divider 12a. The pivot bearing 72a of the seat divider 12a is arranged on an upper side of the carrier element 14a of the seat divider 12a. The pivot bearing unit 70a of the attachment module 40a is connected to the pivot bearing 72a of the seat divider 12a. The pivot bearing unit 70a of the attachment module 40a engages in a form-fitting and/or force-fitting manner in the pivot bearing 72a of the seat divider 12a. The pivot bearing unit 70a of the attachment module 40a is connected in a form-fitting and/or force-fitting manner to the pivot bearing 72a of the seat divider 12a. In the present case, the pivot bearing unit 70a is configured to be pushed into the seat divider 12a and to be secured in a form-fitting manner in the seat divider 12a by means of a securing element. The securing element is realized as a grub screw. The securing element is configured to effect a form-fitting connection between the pivot bearing unit 70a and the seat divider 12a. Alternatively, the pivot bearing unit 70a, in the installation state 44a in which the attachment module 40a is connected to the seat divider 12a, may be pressed into the pivot bearing 72a of the seat divider 12a. In the present case, a pivot bearing element of the pivot bearing unit 70a has a toothing that is configured for rotational coupling in the pivot bearing unit 70a. The pivot bearing unit 70a is of a basic cylindrical shape. In the present case, the pivot bearing unit 70a is of a multipart design. One part of the pivot bearing unit 70a is non-rotatably connected to the seat divider 12a, and another part of the pivot bearing unit 70a is non-rotatably connected to the armrest 22a. The part and the other part are supported so as to be rotatable relative to each other. The pivot bearing unit 70a forms the pivot axis 24a. In principle, however, it would also be conceivable for the pivot bearing unit 70a to be realized in a one-part implementation. In principle, it is conceivable in this case for the pivot bearing unit 70a to be supported in the pivot bearing 72a of the seat divider 12a so as to slide about the pivot axis 24a.

The pivot bearing unit 70a is connected to the attachment base body 66a. The pivot axis 24a of the armrest 22a intersects the attachment base body 66a. The pivot bearing unit 70a is connected to the further attachment base body 68a. The pivot axis 24a of the armrest 22a intersects the further attachment base body 68a. The attachment base body 66a and the further attachment base body 68a are non-rotatably connected to each other via the pivot bearing unit 70a. In the present case, the pivot bearing unit 70a has two form-fit elements 146a, which are not represented in greater detail. The form-fit elements 146a of the pivot bearing unit 70a are configured for coupling to the attachment base body 66a and the further attachment base body 68a. In the present case, the form-fit elements 146a of the pivot bearing unit 70a are non-rotatably connected to the pivot bearing element of the pivot bearing unit 70a by means of a toothing. The attachment base body 66a and the further attachment base body 68a each have, in particular on a side of the attachment base body 66a and of the further attachment base body 68a that faces toward the seat divider 12a, a recess 148a, not represented in greater detail, which is configured to receive the pivot bearing unit 70a, in particular one of the form-fit elements 146a of the pivot bearing unit 70a. The form-fit elements 146a of the pivot bearing unit 70a are configured to correspond, respectively, to the recesses 148a of the attachment base body 66a and of the further attachment base body 68a. The form-fit elements 146a have a shape that at least substantially fills the recesses 148a in each case. The recesses 148a may be, for example, elongate, rectangular, star-shaped or kidney-shaped. In principle, however, the recesses 148a and the form-fit elements 146a may also be of another shape that is considered suitable by a person skilled in the art and that corresponds mutually for a form-fitting and non-rotatable coupling of the recesses 148a and the form-fit elements 146a. The form-fit elements 146a of the pivot bearing unit 70a, at least in the fully installed state 48a, are coupled in a form-fitting manner to the recesses 148a of the attachment base body 66a or of the further attachment base body 68a, about the pivot axis 24a. The form-fit elements 146a of the pivot bearing unit 70a, in the fully installed state 48a, are non-rotatably connected, respectively, to the recesses 148a of the attachment base body 66a and of the further attachment base body 68a. The attachment base body 66a and the further attachment base body are each connected to the pivot bearing unit 70a by at least one fastening element 150a. In the present case, the attachment base body 66a and the further attachment base body 68a are each connected to the pivot bearing unit 70a by four fastening element 150a.

The fastening element 150a are each realized as a screw. The aircraft seat device 10a comprises the fastening element 150a. Alternatively, however, it would also be conceivable for the attachment base body 66a and the further attachment base body 68a to be each connected to the pivot bearing unit 70a by two fastening element 150a or by another number of fastening element 150a considered suitable by a person skilled in the art. In principle, it is conceivable for the pivot bearing unit 70a to be installed in the pivot bearing 72a of the seat divider 12a and then for the attachment base body 66a and the further attachment base body 68a to be connected to the pivot bearing unit 70a. Alternatively, it would also be conceivable for the pivot bearing unit 70a to be installed together with the attachment base body 66a or the further attachment base body 68a on the pivot bearing 72a of the seat divider 12a, with one of the main attachment bodies 66a, 68a being connected to the pivot bearing unit 70a after the pivot bearing unit 70a has been installed in the pivot bearing 72a of the seat divider 12a.

The attachment module 40a has a slotted guide 74a. The slotted guide 74a forms a first end stop 76a for the position of use 26a and a second end stop 78a for the position of non-use 28a. The slotted guide 74a is arranged along a circular arc portion, about the pivot axis 24a of the armrest 22a. The slotted guide 74a is arranged in the attachment base body 66a. The slotted guide 74a is realized as a slot that breaches the attachment base body 66a. There is stop element 80a of the seat divider 12a arranged in the slotted guide 74a. The stop element 80a is realized as a bolt.

The attachment module 40a has a further slotted guide 82a. The slotted guide 74a and the further slotted guide 82a are arranged symmetrically with respect to one another. Together with the slotted guide 74a, the further slotted guide 82a forms the first end stop 76a for the position of use 26a and the second end stop 78a for the position of non-use 28a. Viewed from the side of the aircraft seat device 10a, the slotted guide 74a and the other slotted guide 82a are congruent. The further slotted guide 82a is arranged along a circular arc portion, about the pivot axis 24a of the armrest 22a. The further slotted guide 82a is arranged in the further attachment base body 68a. The further slotted guide 82a is realized as a slot that breaches the further attachment base body 68a. There is a further stop element of the seat divider 12a, realized as a bolt, arranged in the further slotted guide 82a.

In principle, it would be conceivable for the attachment module 40a to have only one slotted guide 74a, 82a, with only the attachment base body 66a or the further attachment base body 68a having a slot, in which a stop element 80a of the seat divider 12a is guided.

The aircraft seat device 10a comprises a cable channel 84a that, starting from the armrest base body 30a, extends through the attachment module 40a into the seat divider 12a. The cable channel 84a is routed in one portion through the seat divider 12a. The cable channel 84a is routed in the portion from a rear side of the seat divider 12a to a front side 88a of the seat divider 12a. The aircraft seat device 10a has a cover element 86a, which is connected to the seat divider 12a. The cover element 86a forms a portion of the cable channel 84a that extends, in particular, on the front side 88a of the seat divider 12a. The cover element 86a is connected in a force-fitting and/or form-fitting manner to the carrier element 14a of the seat divider 12a. The cover element 86a is realized as a facing of the seat divider 12a. The cover element 86a surrounds the seat divider 12a, in particular the carrier element 14a of the seat divider 12a, at least substantially in a region between the bearing point 20a and the underside 46a of the armrest 22a.

The cable channel 84a is configured to receive at least one cable, which is not represented in greater detail. The at least one cable is realized, for example, as a Bowden cable or as an electrical line. The at least one cable is configured to transfer at least one mechanical and/or electronic actuation signal and/or operating signal, for example for the purpose of adjusting a backrest and/or a leg rest and/or for the purpose of operating an in-flight entertainment system. The arm rest 22a has at least one actuating element and/or operator-controlled element, not represented in greater detail. The at least one actuating element and/or operator-controlled element is arranged in one of a plurality of cutouts 90a, 92a, 94a, 96a, 98a of the armrest base body 30a. In principle, it is conceivable for the armrest base body 30a also to have only one cutout 90a, 92a, 94a, 96a, 98a or another number of cutouts 90a, 92a, 94a, 96a, 98a for receiving an actuating element and/or operator-controlled element. In principle, it would also be conceivable for the armrest base body 30a to have predetermined breaking points to form the cutouts 90a, 92a, 94a, 96a, 98a, by means of which the cutouts 90a, 92a, 94a, 96a, 98a can be produced as required. The at least one actuating element and/or operator-controlled element is fastened to the armrest base body 30a. The at least one actuating element and/or operator-controlled element is functionally coupled to the at least one cable. In principle, it would be conceivable for the armrest 22a to have at least one dummy cap that can be arranged, instead of an actuating element and/or operator-controlled element, in at least one of the cutouts 90a, 92a, 94a, 96a, 98a of the armrest base body 30a.

In the fully installed state 48a, the seat divider 12a extends to a rear side 100a of the armrest 22a. The seat divider 12a forms a rear cover of the attachment space 42a of the armrest 22a. The seat divider 12a is partially arranged in the attachment space 42a. The seat divider 12a is arranged in the attachment region 60a between the attachment base body 66a and the further attachment base body 68a. The armrest 22a and the attachment module 40a are movable relative to the seat divider 12a.

The armrest 22a comprises a release mechanism 102a. The release mechanism 102a is realized as a handicap mechanism. The release mechanism 102a is configured, upon being actuated, to allow pivoting of the armrest 22a from the position of use 26a to the position of non-use 28a. The release mechanism 102a is configured, in a normal operating state, to block pivoting of the armrest 22a from the position of use 26a to the position of non-use 28a. The release mechanism 102a is arranged at least substantially within the armrest 22a, in particular in the inner space 38a of the armrest 22a. The release mechanism 102a is connected to the armrest base body 30a by a plurality of fastening element 104a, which are in particular realized as screws. The aircraft seat device 10a comprises the plurality of fastening element 104a. The release mechanism 102a has a form-fit element 106*a* that, when the armrest 22*a* is in the position of use 26*a*, is configured to engage in a recess 108*a* of the seat divider 12*a*. The release mechanism 102*a* has an actuating element 110*a*. The actuating element 110*a* of the release mechanism 102*a* is realized as a lever. The actuating element 110*a* of the release mechanism 102*a* protrudes from an underside of the armrest base body 30*a*. The form-fit element 106*a* is coupled to the actuating element 110*a*. The form-fit element 106*a* is configured, upon actuation of the actuating element 110*a*, to be moved out of the recess 108*a* of the seat divider 12*a*. This allows pivoting of the armrest 22*a* to be released.

The aircraft seat device 10*a* has an indentation 112*a* that, in the position of use 26*a*, is arranged directly on the front side 88*a* of the seat divider 12*a*, beneath the armrest base body 30*a*. The indentation 112*a* is surrounded on at least three sides by the armrest base body 30*a*. The indentation 112*a* adjoins the lateral walls 56*a*, 58*a* of the armrest base body 30*a*. When the armrest 22*a* is in the position of use 26*a*, the indentation 112*a* is concealed by the armrest base body 30*a* when viewed from the side of the aircraft seat device 10*a* (see FIG. 1).

FIG. 9 shows a method 114*a* for installing the aircraft seat device 10*a*. In the present case, the method 114*a* comprises a first method step 116*a* and a second method step 118*a*.

In the first method step 116*a*, the attachment module 40*a* is coupled to the seat divider 12*a*. In the first method step 116*a*, the attachment module 40*a* is attached to the seat divider 12*a*. In the first method step 116*a*, the pivot bearing unit 70*a* of the attachment module 40*a* is connected to the pivot bearing 72*a* of the seat divider 12*a*. In the first method step 116*a*, the attachment base body 66*a* is non-rotatably connected to the pivot bearing unit 70*a* of the attachment module 40*a*. In the first method step 116*a*, the further attachment base body 68*a* is non-rotatably connected to the pivot bearing unit 70*a* of the attachment module 40*a*. In the first method step 116*a*, the armrest 22*a* is separated from the attachment module 40*a* and the seat divider 12*a*. After the first method step 116*a*, there exists the installation state 44*a*, in which the attachment module 40*a* is connected to the seat divider 12*a*. After the first method step 116*a*, the attachment module 40*a* is pivotably supported on the seat divider 12*a*.

In the second method step 118*a*, which follows the first method step 116*a*, the armrest base body 30*a* is coupled to the attachment module 40*a*. In the second method step 118*a*, the armrest 22*a* is connected to the attachment module 40*a*. In the second method step 118*a*, the armrest 22*a*, in particular the armrest base body 30*a*, is pushed onto the attachment module 40*a*. In the second method step 118*a*, the attachment module 40*a* is pushed into the armrest 22*a*, in particular into the armrest base body 30*a*. After the second method step 118*a*, the armrest 22*a*, in particular the armrest base body 30*a*, is pivotably connected to the seat divider 12*a* via the attachment module 40*a*.

FIGS. 10 and 11 show two further exemplary embodiments of the invention. The following descriptions and the drawings are limited substantially to the differences between the exemplary embodiments, and reference may also be made in principle to the drawings and/or the description of the first exemplary embodiment, in particular of FIGS. 1 to 9, with regard to components having the same designation, in particular with regard to components with the same reference designations. To differentiate between the exemplary embodiments, the reference designations of the exemplary embodiment in FIGS. 1 to 9 are suffixed by the letter a. In the exemplary embodiments of FIGS. 10 and 11, the letter a is replaced by the letters b and c respectively.

FIG. 10 shows an aircraft seat device 10*b* in the second exemplary embodiment. The aircraft seat device 10*b* comprises a seat divider 12*b*. The seat divider 12*b* has two attachment points 16*b*, 18*b*, by means of which the seat divider 12*b* is connected to the stand unit, in particular to two support tubes of the stand unit. The aircraft seat device 10*b* comprises an armrest 22*b*. The armrest 22*b* has a pivot axis 24*b*. The armrest 22*b* is supported so as to be pivotable about the pivot axis 24*b*. The armrest 22*b* has an armrest base body 30*b*. The armrest 22*b* has an arm support element 34*b*. The arm support element 34*b* is arranged on an upper side 36*b* of the arm rest 22*b*. An inner space 38*b* of the armrest 22*b* between the armrest base body 30*b* and the arm support element 34*b* does not have an additional support structure. The aircraft seat device 10*b* comprises an attachment module 40*b*. The armrest 22*b* has an attachment space 42*b*. The attachment module 40*b* is configured, in an installation state in which the attachment module 40*b* is connected to the seat divider 12*b*, to be coupled to the armrest base body 30*b*. In a fully installed state 48*b*, the armrest base body 30*b* is coupled to the seat divider 12*b* via the attachment module 40*b*. The attachment module 40*b* is delimited in the attachment space 42*b* of the armrest 22*b* by lateral walls of the armrest base body 30*b*. In an attachment region 60*b* of the armrest 22*b*, the armrest 22*b* has lateral outer faces that are fully closed and formed by the armrest base body 30*b*. The attachment module 40*b* has an attachment base body 66*b*. The attachment module 40*b* has a further attachment base body, which is not visible. The attachment module 40*b* has a pivot bearing unit 70*b*. The seat divider 12*b* has a pivot bearing 72*b*. The armrest 22*b* comprises a release mechanism 102*b*, which is realized as a handicap mechanism. The aircraft seat device 10*b* has an indentation 112*b* that, in the position of use 26*b*, is arranged directly on a front side 88*b* of the seat divider 12*b*, beneath the armrest base body 30*b*.

In the present case, the seat divider 12*b* is of a multipart design. The seat divider 12*b* has a carrier element 14*b*. The carrier element 14*b* of the seat divider 12*b* is realized a one-part implementation.

In contrast to the first exemplary embodiment, the armrest 22*b* is pivotable via more than one pivot axis. The armrest 22*b* is pivotable between a position of use 26*b*, a position of non-use and a further position of non-use with respect to the seat divider 12*b*. In the further position of non-use, the armrest 22*b* is pivoted to a maximum with respect to the position of use 26*b*.

The armrest 22*b* is pivotable via two parallel and mutually spaced pivot axes 24*b*, 120*b*. The armrest 22*b* has a pivot axis 24*b* and a further pivot axis 120*b*. The pivot axis 24*b* is formed by the pivot bearing 72*b* of the seat divider 12*b*, which pivot bearing is coupled to the pivot bearing unit 70*b* of the attachment module 40*b*. The seat divider 12*b* has a pivot carrier element 122*b*. The pivot carrier element 122*b* is arranged, at least to a large extent, between the pivot axis 24*b* and the further pivot axis 120*b*. The pivot carrier element 122*b* of the seat divider 12*b* is realized in a one-part implementation. The pivot carrier element 122*b* is configured to pivot the pivot bearing 72*b* of the seat divider 12*b*, in particular the pivot axis 24*b*, relative to the further pivot axis 120*b*. The pivot bearing 72*b* of the seat divider 12*b* is directly connected to the pivot carrier element 122*b*. The pivot bearing 72*b* of the seat divider 12*b* is integrated into the pivot carrier element 122*b* of the seat divider 12*b*. The pivot bearing 72*b* of the seat divider 12*b* is arranged on an upper side of the pivot carrier element 122*b* of the seat divider 12*b*. The attachment module 40*b* is pivotably connected to the pivot carrier element 122b. The pivot carrier element 122b is pivotable via the further pivot axis 120b, in particular with respect to the stand unit. In the further position of non-use, the pivot carrier element 122b is pivoted with respect to the position of non-use. The pivot carrier element 122b of the seat divider 12b is supported so as to be pivotable, via the further pivot axis 120b, with respect to the carrier element 14b of the seat divider 12b. The seat divider 12b has a further pivot bearing 124b. The pivot carrier element 122b of the seat divider 12b is coupled to the carrier element 14b of the seat divider 12b via the further pivot bearing 124b. The further pivot bearing 124b forms the further pivot axis 120b. The further pivot bearing 124b of the seat divider 12b is integrated into the carrier element 14b of the seat divider 12b. The further pivot bearing 124b of the seat divider 12b is arranged on an upper side of the carrier element 14b of the seat divider 12b. The further pivot bearing 124b of the seat divider 12b is arranged on an underside of the pivot carrier element 122b of the seat divider 12b, on the carrier element 14b of the seat divider 12b.

The seat divider 12b has a bearing point 20b on which a backrest of an aircraft seat can be supported, in particular pivotably. The bearing point 20b is arranged on the carrier element 14b of the seat divider 12b. The bearing point 20b is coaxial with the further pivot axis 120b. The bearing point 20b is integrated into the further pivot bearing 124b.

The armrest 22b is configured to first be pivoted from the position of use 26b to the position of non-use via the pivot axis 24b. The armrest 22b is then configured to be pivoted by means of the pivot carrier element 122b, via the further pivot axis 120b, from the position of non-use to the further position of non-use.

The attachment module 40b is supported so as to be pivotable with respect to the seat divider 12b, in particular the carrier element 14b of the seat divider 12b, in an angular range between the position of use 26b and the position of non-use. In the present case, the angular range is 115 degrees.

The pivot carrier element 122b is supported so as to be pivotable with respect to the carrier element 14b of the seat divider 12b in an angular range between the position of non-use and the further position of non-use. In the present case, the angular range is 15 degrees.

The armrest 22b is pivotable by at least 110 degrees from the position of use 26b to the position of non-use. The armrest 22b is pivotable by at least 120 degrees from the position of use 26b into the further position of non-use. In the present case, the armrest 22b is pivotable by up to 130 degrees from the position of use 26b to the further position of non-use.

A distance 126b of the pivot axis 24b of the armrest 22b from an underside 128b of the armrest base body 30b in the position of use 26b is less than a distance 130b of the pivot axis 24b of the armrest 22b from an upper side 132b of the arm support element 34b. The pivot axis 124b is arranged, in particular in any position of the arm rest 22b in the fully installed state 48b, outside of a geometric center 152b of the arm rest 22b in the attachment region 60b. The geometric center 152b of the armrest 22b, in particular when the armrest 22b is in the position of use 22b, an equal distance from the upper side 132b of the arm support element 34b and from the underside 128b of the armrest base body 30b, in particular measured orthogonally to a stand plane. The pivot axis 24b is arranged beneath the geometric center 152b of the armrest 22b in the attachment region 60b.

The aircraft seat device 10b comprises a cable channel 84b that, starting from the armrest base body 30b, extends through the attachment module 40b into the seat divider 12b. The cable channel 84b is routed in one portion through the seat divider 12b. The seat divider 12b, in particular the pivot carrier element 122b, is hollow for this purpose.

The aircraft seat device 10b has a cover element 86b that is connected to the seat divider 12b. The cover element 86b is connected to the carrier element 14b of the seat divider 12b. The cover element 86b forms a portion of the cable channel 84b that extends along the front side 88b of the seat divider 12b. The cover element 86b is connected in a force-fitting and/or form-fitting manner to the carrier element 14b of the seat divider 12b.

The aircraft seat device 10b has a further cover element 140b, which is connected to the seat divider 12b. The further cover element 140b is connected to the pivot carrier element 122b of the seat divider 12b. The further cover element 140b forms a further portion of the cable channel 84b, which extends on the front side 88b of the seat divider 12b. The further cover element 140b is connected to the pivot carrier element 122b of the seat divider 12a in a force-fitting, form-fitting and/or materially bonded manner. In principle, it would also be conceivable for the further cover element 140b to be cast with the pivot carrier element 122b. The further cover element 140b is supported so as to be movable with respect to the cover element 86b. The further cover element 140b is supported so as to be pivotable, via the further pivot axis 120b, with respect to the cover element 86b. The cover element 86b and the further cover element 140b are arranged to overlap each other, at least when the armrest 22b is in the position of use 26b and in the position of non-use of the. The cover element 86b and the further cover element 140b contact each other in each operating state.

Furthermore, in contrast to the first exemplary embodiment, a direction of installation is realized differently in the second exemplary embodiment. When the armrest 22b is in the position of use 26b, the attachment space 42b of the armrest 22b is open toward a rear side 100b of the armrest 22b. The attachment module 40b is configured, in the installation state in which the attachment module 40b is connected to the seat divider 12b, to be pushed into the attachment space 42b of the arm rest 22b, starting from the rear side 100b of the arm rest 22b, in the direction of a front side 134b of the arm rest 22b. When the armrest base body 30b is positioned in an orientation as in the position of use 26b, a direction of connection of the attachment module 40b and of the armrest 22b is aligned at least substantially parallel to the stand plane.

The seat divider 12b has a stop element 136b. The stop element 136b of the seat divider 12b is arranged on the pivot carrier element 122b. The stop element 136b of the seat divider 12b is arranged on the rear side 100b of the armrest 22b. The attachment base body 66b and the further attachment base body form a further stop element 138b. The further stop element 138b is designed to correspond to the stop element 136b of the seat divider 12b. When the armrest 22b is in the position of use 26b, the further stop element 138b is arranged on the rear side 100b of the armrest 22b. When the armrest is in the position of use 26b, the stop element 136b of the seat divider 12b and the further stop element 138b contact each other.

FIG. 11 shows an aircraft seat device 10c in a third exemplary embodiment. The aircraft seat device 10c comprises a seat divider 12c. The seat divider 12c has a carrier element 14c. The aircraft seat device 10c comprises an armrest 22c. In the present case, the armrest 22c is realized as a center armrest. The armrest 22c has a pivot axis 24c. The armrest 22c is pivotable with respect to the seat divider 12c between a position of use 26c and a position of non-use 28c. In the position of non-use 28c, the armrest 22c is pivoted to a maximum with respect to the position of use 26c. For clarity, in FIG. 11 the armrest 22c in the position of use 26c is represented by a dashed line. The armrest 22c has an armrest base body 30c. The armrest 22c has an arm support element 34c. The aircraft seat device 10c comprises an attachment module 40c. The armrest 22c has an attachment space 42c. In a fully installed state 48c, the armrest base body 30c is coupled to the seat divider 12c via the attachment module 40c. The attachment module 40c has an attachment base body 66c and a further attachment base body that is not visible. In FIG. 11, the attachment base body 66c is represented with the armrest 22c pivoted into the position of non-use 28c. The aircraft seat device 10c comprises a cable channel 84c. The aircraft seat device 10c has a cover element 86c that is connected to the seat divider 12c. The aircraft seat device 10c has an indentation 112c.

The third exemplary embodiment corresponds substantially to the first exemplary embodiment, but with the main armrest bodies 30a, 30c being shaped differently. Compared to the armrest base body 30a from the first exemplary embodiment, the armrest base body 30c extends to a lesser extent from the pivot axis 24c at an underside 128c of the armrest base body 30c when the armrest 22c is in the position of use 22c. Upon the armrest 22c being pivoted from the position of use 26c to the position of non-use 28c, the armrest base body 30c approaches the stand plane. With this design, it can advantageously be achieved that the armrest 22c, in particular the armrest base body 30c, protrudes to a lesser extent into a region on a front side 88c of the seat divider 12c in the position of non-use 28c. It can thus be achieved, advantageously, that the armrest 22c in the position of non-use 28c does not protrude into a back support region. Passenger comfort can thus advantageously be increased, since there are no interfering components, in particular the armrest 22c, substantially contacting the passenger.

The invention claimed is:

1. An aircraft seat device having a seat divider, having an armrest which is pivotable, with respect to the seat divider, between a position of use and a position of non-use and which has an armrest base body, and having an attachment module, which is configured to support the armrest in a pivotable manner with respect to the seat divider, wherein the armrest base body, in a fully installed state, is coupled with the seat divider via the attachment module, wherein the attachment module is pivotably connected to the seat divider and is configured, in an installation state in which the attachment module is connected to the seat divider, for coupling with the armrest base body, wherein the attachment module, in the fully installed state, is received at least substantially in an attachment space of the armrest.

2. The aircraft seat device as claimed in claim 1, wherein, in an installation state in which the attachment module is connected to the seat divider, the armrest base body can be installed on the attachment module.

3. The aircraft seat device as claimed in claim 1, the armrest base body is connected to the attachment module by at least one fastening element, wherein the at least one fastening element, in a fully installed state, is concealed by an arm support element, of the armrest.

4. The aircraft seat device as claimed in claim 1, wherein the attachment module in the attachment space of the armrest is delimited by lateral walls of the armrest base body and is at least largely concealed.

5. The aircraft seat device as claimed in claim 1, wherein the armrest, in an attachment region of the armrest, has lateral outer faces that are fully closed and formed by the armrest base body.

6. The aircraft seat device as claimed in claim 1, wherein the attachment module has at least one slotted guide, in which at least one stop element of the seat divider is arranged and which forms a first end stop for the position of use and a second end stop for the position of non-use.

7. The aircraft seat device as claimed in claim 1, wherein the armrest base body is realized in a one-part implementation, in particular integrally.

8. The aircraft seat device as claimed in claim 1, wherein an inner space of the armrest between the armrest base body and the arm support element does not have an additional support structure.

9. The aircraft seat device as claimed in claim 1, wherein the armrest base body is made at least substantially of a fiber-reinforced plastic.

10. The aircraft seat device as claimed in claim 1, wherein a distance of a pivot axis of the armrest from an underside of the armrest base body, in particular in the position of use, is less than a distance of the pivot axis of the armrest from an upper side of the arm support element.

11. The aircraft seat device as claimed in claim 1, comprising at least one cable channel that, starting from the armrest base body, extends through the attachment module into the seat divider.

12. The aircraft seat device as claimed in claim 1, comprising an indentation that, in the position of use, is arranged directly on a front side of the seat divider, beneath the armrest base body.

13. A method for a fabrication of an armrest base body as claimed in claim 1, wherein, in a first method step, in a tailored fiber placement process (TFP process) a preform is fabricated from an embroidery base having fiber mats or fiber bundles embroidered thereon, such that the preform has different wall thicknesses in different regions; and in a further method step following the first method step, embedding the preform into a plastic matrix by a resin transfer molding (RTM) process.

14. The aircraft seat device as claimed in claim 1, wherein the armrest base body has a plastic matrix and at least one preform, which in particular is fabricated by means of a tailored fiber placement process, embedded in the plastic matrix.

15. The aircraft seat device as claimed in claim 14, wherein the armrest base body is fabricated by means of a resin transfer molding process, wherein the preform is configured to be embedded into the plastic matrix during the resin transfer molding process.

16. The aircraft seat device as claimed in claim 1, wherein the armrest is pivotable via two pivot axes that are aligned parallel to each other and spaced apart from each other.

17. The aircraft seat device as claimed in claim 16, wherein the armrest is pivotable by at least 110 degrees, in particular by at least 120 degrees, from the position of use to the position of non-use and/or a further position of non-use.

18. The aircraft seat device as claimed in claim 1, wherein the attachment module has at least one attachment base body that, in a fully installed state, is at least substantially received in the armrest base body.

19. The aircraft seat device as claimed in claim 18, wherein the attachment module has a pivot bearing unit, which is connected to the at least one attachment base body and via which the attachment module is pivotably supported on the seat divider.

20. The aircraft seat device as claimed in claim 18, wherein the at least one slotted guide is arranged in the at least one attachment base body.

21. The aircraft seat device as claimed in claim 1, wherein the armrest base body comprises lateral walls adjacent the attachment module, the lateral walls forming lateral outer faces of the armrest, and wherein, in an attachment region in which the armrest base body overlaps the attachment module, the lateral outer faces are fully closed such that each lateral outer face has an uninterrupted continuous surface that is free of cutouts and steps.

22. An aircraft seat device having a seat divider, having an armrest which is pivotable, with respect to the seat divider, between a position of use and a position of non-use and which has an armrest base body, and having an attachment module, which is configured to support the armrest in a pivotable manner with respect to the seat divider, wherein the armrest base body, in a fully installed state, is coupled with the seat divider via the attachment module, wherein the attachment module is pivotably connected to the seat divider and is configured, in an installation state in which the attachment module is connected to the seat divider, for coupling with the armrest base body, wherein the attachment module, in the fully installed state, is received at least substantially in an attachment space of the armrest, wherein the armrest base body is configured, when in the installation state in which the attachment module is connected to the seat divider, to be removable from the attachment module, and the attachment module does not have to be separated from the seat divider in order to install and/or remove the armrest.

23. An aircraft seat device having a seat divider, having an armrest which is pivotable, with respect to the seat divider, between a position of use and a position of non-use and which has an armrest base body, and having an attachment module, which is configured to support the armrest in a pivotable manner with respect to the seat divider, wherein the armrest base body, in a fully installed state, is coupled with the seat divider via the attachment module, wherein the attachment module is pivotably connected to the seat divider and is configured, in an installation state in which the attachment module is connected to the seat divider, for coupling with the armrest base body, wherein the attachment module, in the fully installed state, is received at least substantially in an attachment space of the armrest, wherein the attachment module in the attachment space of the armrest is delimited by lateral walls of the armrest base body and is at least largely concealed, wherein the attachment module has at least one slotted guide, in which at least one stop element of the seat divider is arranged and which forms a first end stop for the position of use and a second end stop for the position of non-use.

* * * * *